Sept. 19, 1939.　　　A. F. POTT　　　2,173,635
CALCULATING MACHINE
Filed Aug. 8, 1935　　　23 Sheets-Sheet 1

Sept. 19, 1939.  A. F. POTT  2,173,635

CALCULATING MACHINE

Filed Aug. 8, 1935  23 Sheets-Sheet 2

A. F. Pott
Inventor

By Glascock Downing & Seebold
Attys.

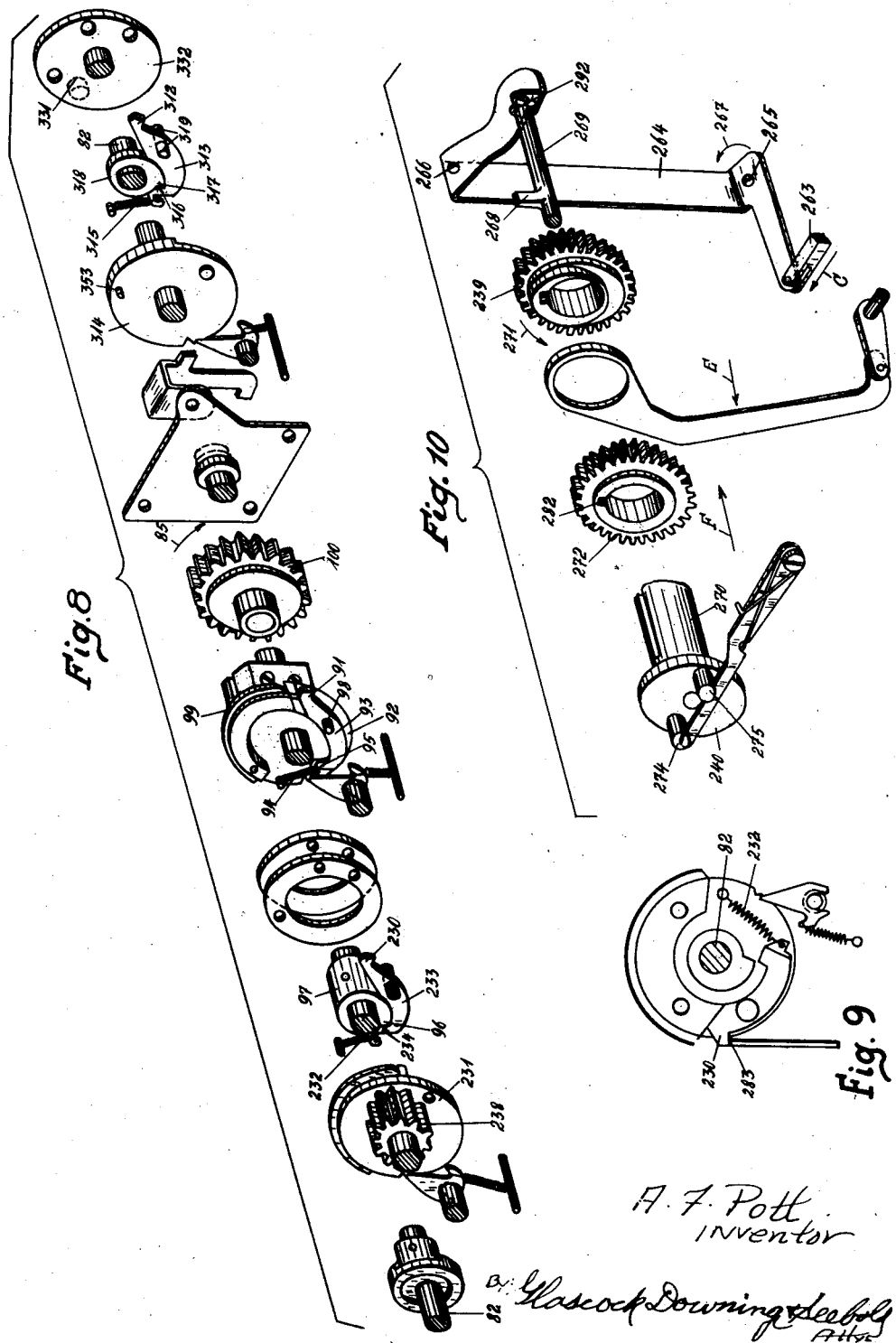

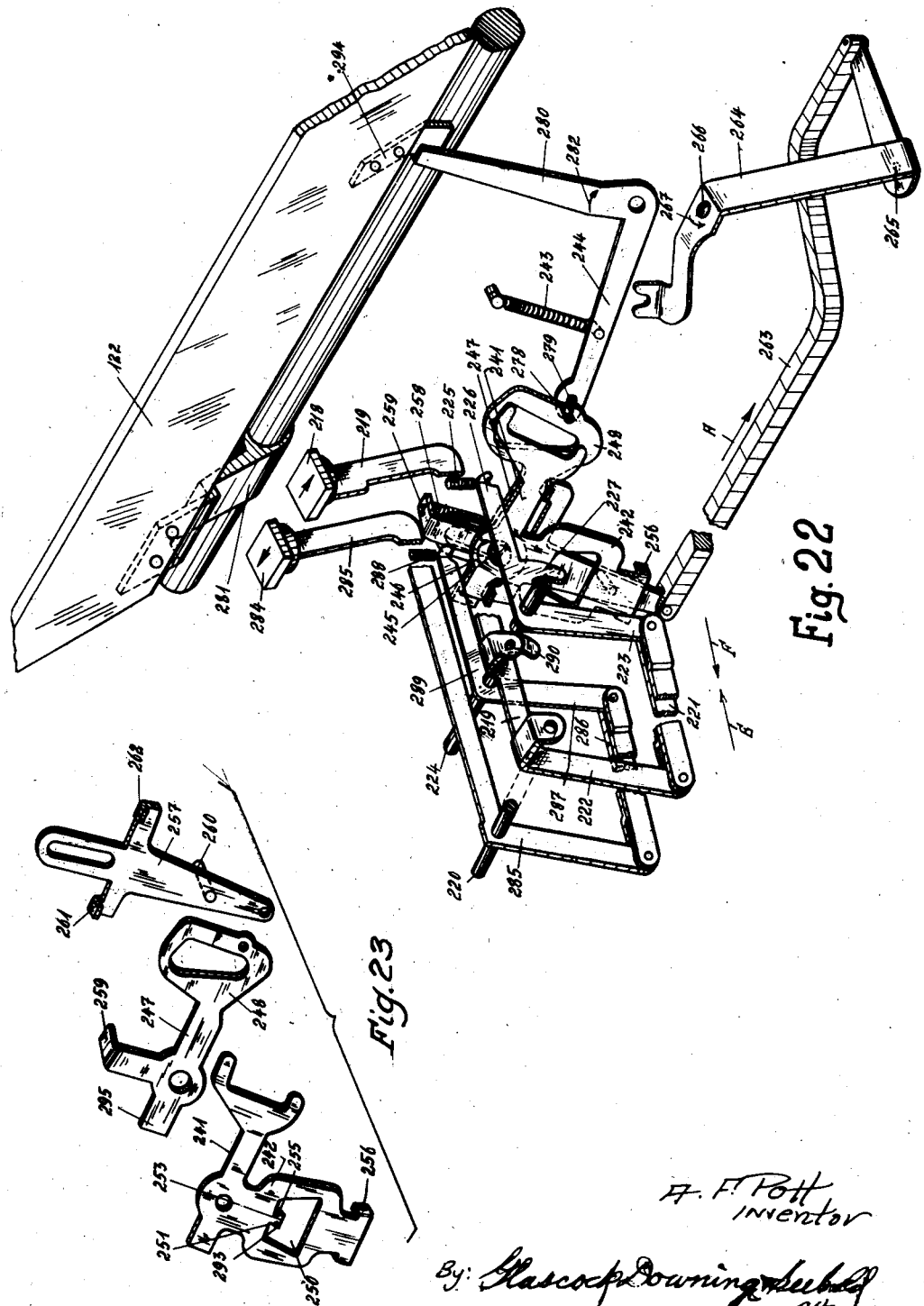

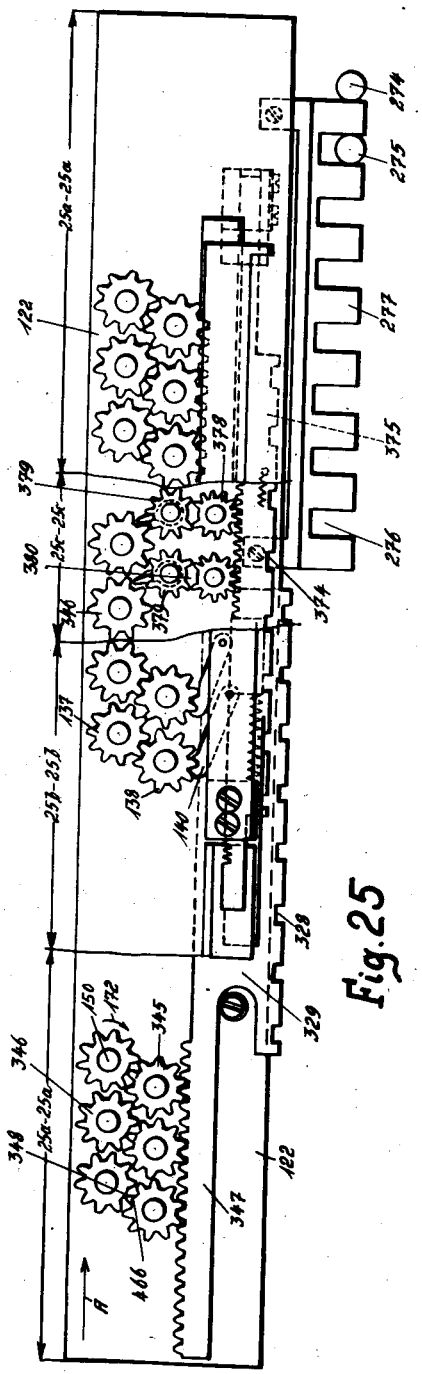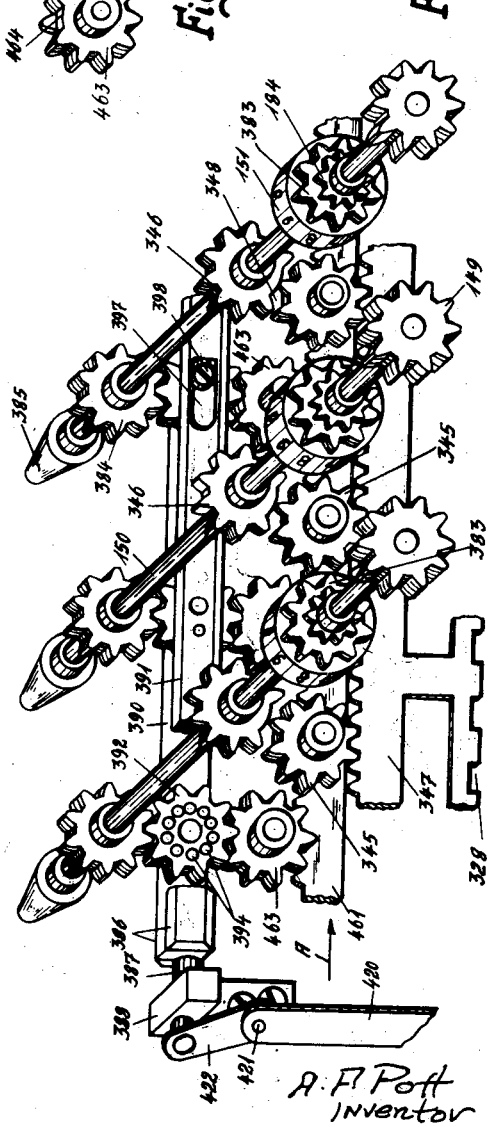

Sept. 19, 1939. A. F. POTT 2,173,635
CALCULATING MACHINE
Filed Aug. 8, 1935 23 Sheets-Sheet 11

Sept. 19, 1939.  A. F. POTT  2,173,635
CALCULATING MACHINE
Filed Aug. 8, 1935  23 Sheets-Sheet 12

A. F. Pott
Inventor

By: Glascock Downing & Seebold
Attys.

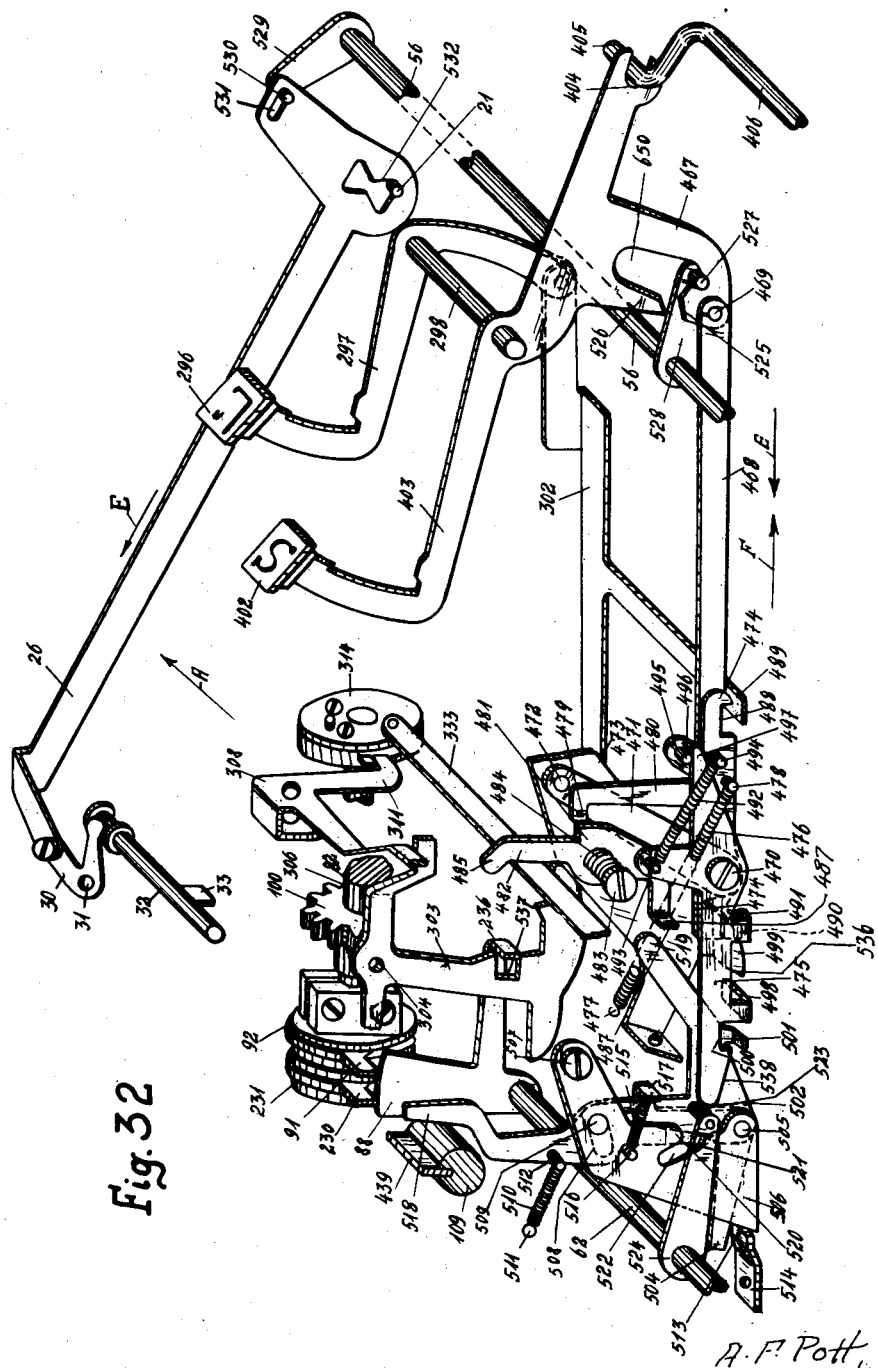

Sept. 19, 1939.    A. F. POTT    2,173,635
CALCULATING MACHINE
Filed Aug. 8, 1935    23 Sheets-Sheet 14
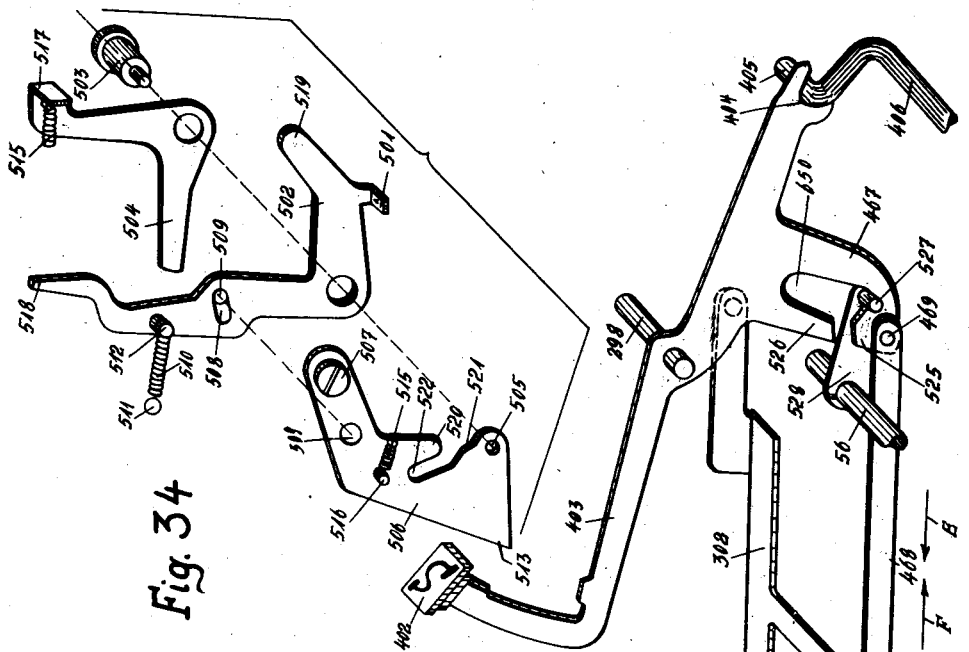
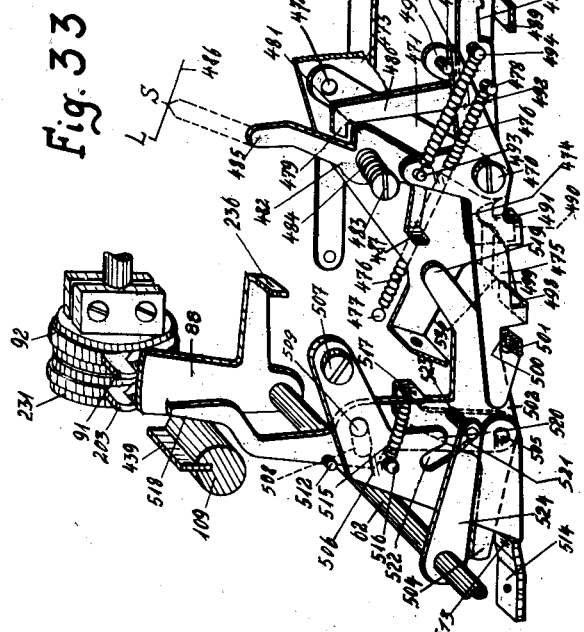

Sept. 19, 1939.   A. F. POTT   2,173,635
CALCULATING MACHINE
Filed Aug. 8, 1935   23 Sheets-Sheet 15

A. F. Pott
Inventor

By Glascock Downing & Seebold
Attys.

Sept. 19, 1939.　　　　A. F. POTT　　　　2,173,635
CALCULATING MACHINE
Filed Aug. 8, 1935　　　　23 Sheets-Sheet 18
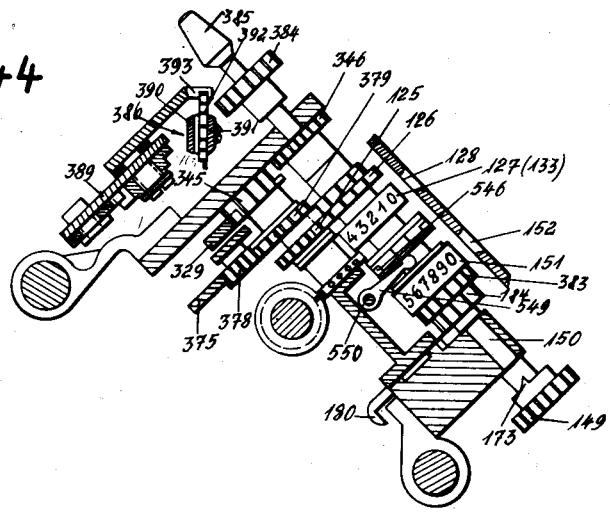
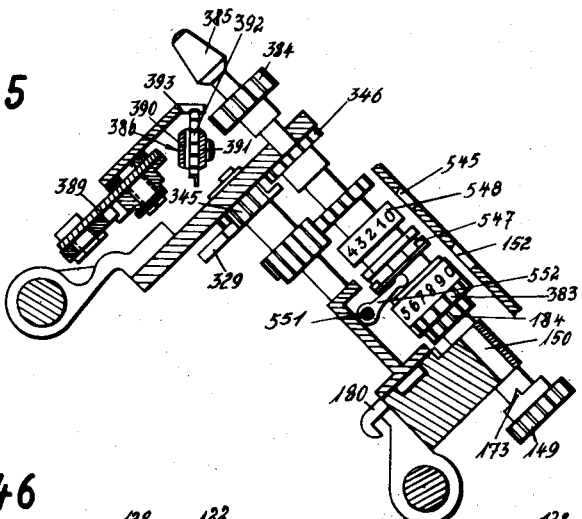
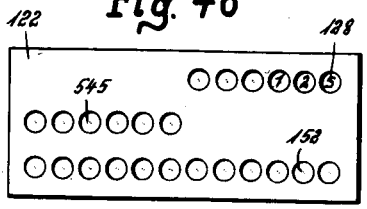
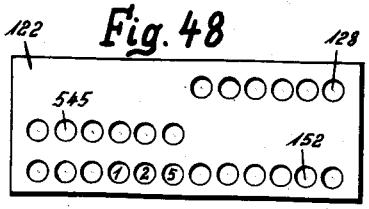
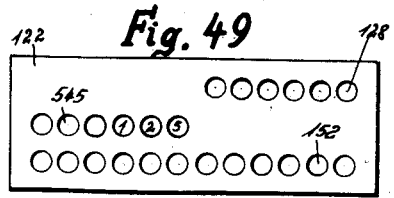
A. F. Pott
INVENTOR
By: Glascock Downing & Seebold
ATTYS.

Sept. 19, 1939.  A. F. POTT  2,173,635
CALCULATING MACHINE
Filed Aug. 8, 1935  23 Sheets-Sheet 19

Sept. 19, 1939.                  A. F. POTT                    2,173,635
                           CALCULATING MACHINE
                        Filed Aug. 8, 1935         23 Sheets-Sheet 20

A. F. Pott
INVENTOR

By: Glascock Downing Seebold
Attys.

Sept. 19, 1939.                A. F. POTT                2,173,635
                        CALCULATING MACHINE
                     Filed Aug. 8, 1935           23 Sheets-Sheet 21

A. F. Pott
INVENTOR

By: Glascock Downing Seebold
                  Attys.

Sept. 19, 1939.　　　A. F. POTT　　　2,173,635
CALCULATING MACHINE
Filed Aug. 8, 1935　　　23 Sheets-Sheet 22

Sept. 19, 1939.   A. F. POTT   2,173,635
CALCULATING MACHINE
Filed Aug. 8, 1935   23 Sheets-Sheet 23
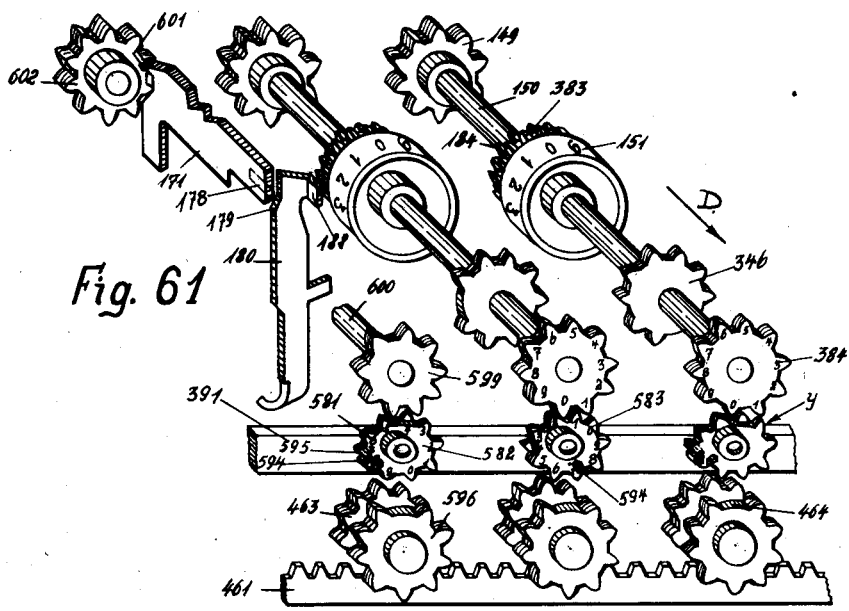
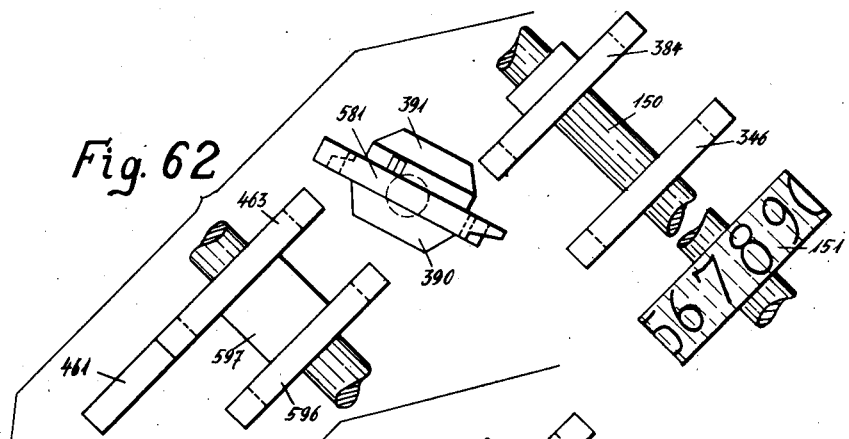
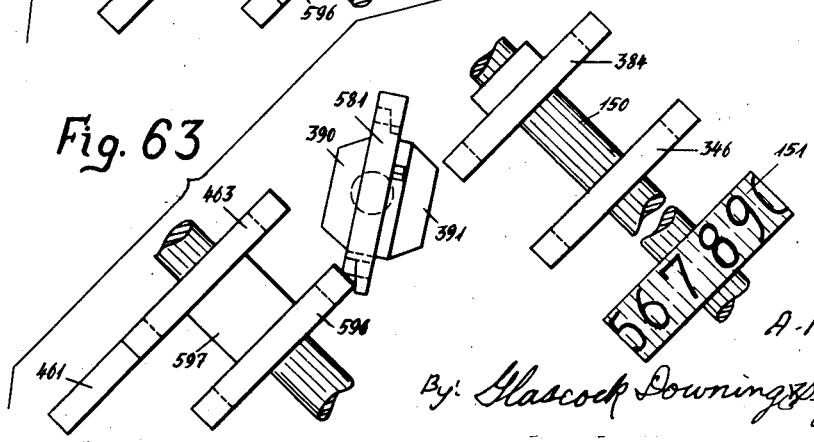

Patented Sept. 19, 1939

2,173,635

UNITED STATES PATENT OFFICE 2,173,635

CALCULATING MACHINE

August Friedrich Pott, Zella-Mehlis, Germany, assignor to Mercedes Buromaschinen-Werke Aktiengesellschaft, Zella-Mehlis, Thuringia, Germany Application August 8, 1935, Serial No. 35,389
In Germany April 30, 1932

17 Claims. (Cl. 235—73)

This invention relates to improvements in calculating machines of the well known Mercedes Euklid type as exemplified in my prior Patent No. 2,143,741 of January 10, 1939, and this is a continuation in part of my application Serial No. 668,120, filed April 26, 1933.

Machines of this type are ordinarily equipped with an accumulator and an amount storing means and the object of the present invention is to provide improved means for transferring values from the accumulator to the amount storing means and vice versa.

A preferred embodiment of the invention has been illustrated in the accompanying drawings, set forth in detail in the following description and defined in the claims appended hereto.

In the drawings:

Figure 8 shows a perspective view of the main drive shaft with the three driving clutches as viewed from the rear of the machine.

Figure 9 shows a section along the line 9—9 of Figure 2, viewed in the direction of the arrows at said line.

Figure 10 shows a perspective view, with the parts separated out of one another, of the draw key clutch for the reverse gearing of the carriage shifting mechanism together with the control parts viewed from the rear of the machine.

Figure 16:
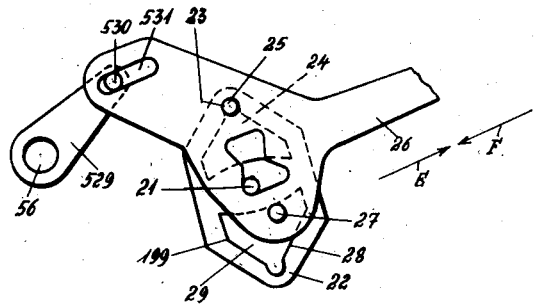
Figures 16 and 17 show two different positions of the control lever for the draw key clutch of the reverse gearing for the revolution counter and show.

Figure 16 the position in the normal addition operation

Figure 17:
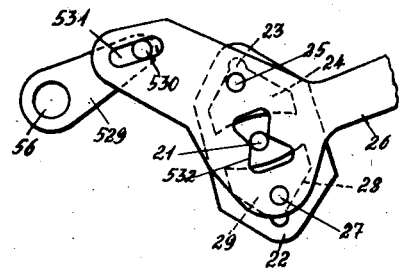

Figure 17 the position in which the revolution counter is disconnected.

Figure 18:
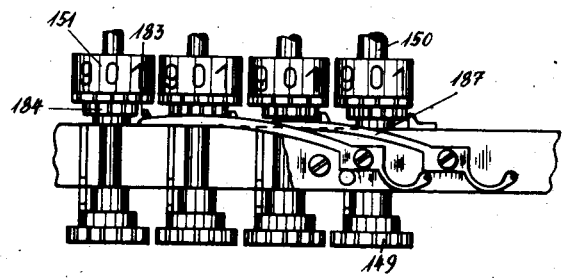
Figure 28:
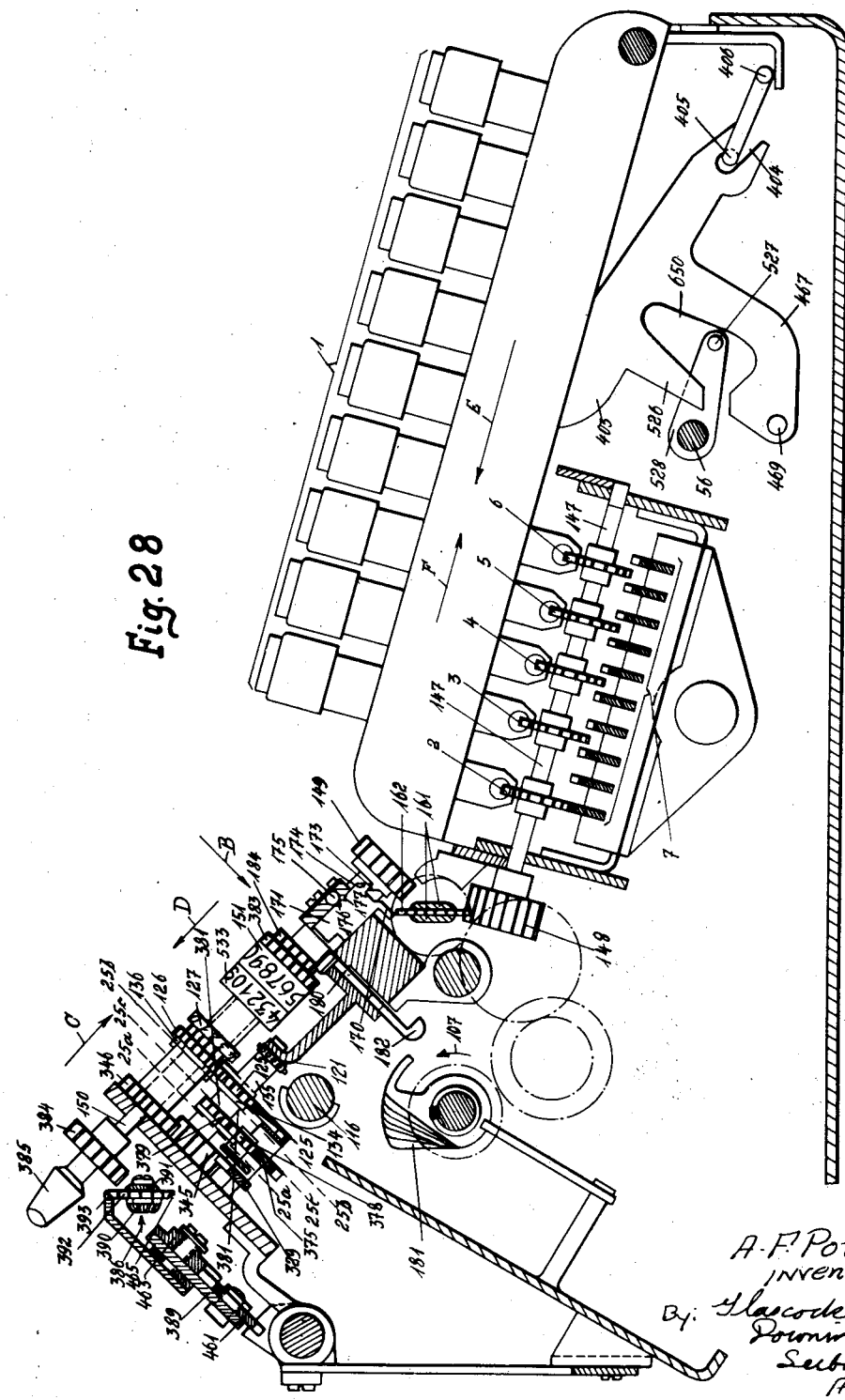

Figure 18 shows a part plan of the tens carrying parts viewed in the direction of the arrow B in Figure 28 with partly exposed preparatory members and numeral wheel shafts.

Figure 19:
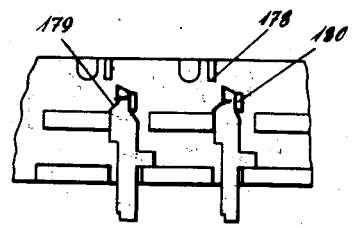

Figure 19 shows a view taken in the direction of the arrow C of Figure 28 in which for the purpose of exposing the tens shift slides and their guides, the cover rail is omitted.

Figure 20:
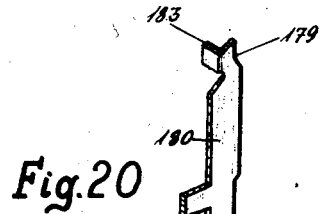

Figure 20 shows a tens shift slide in perspective view.

Figure 21:
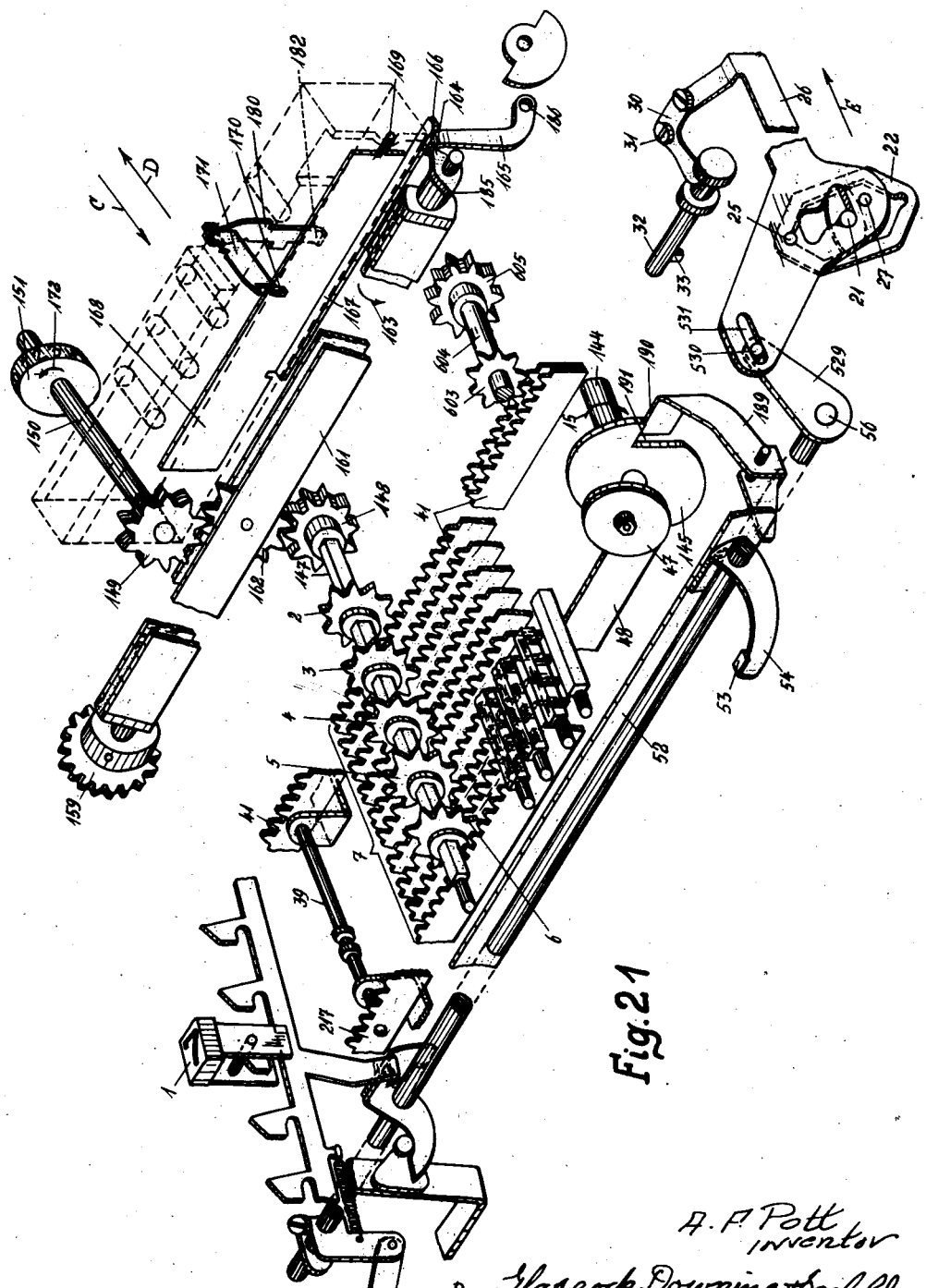

Figure 21 shows a perspective view of the keylocking mechanism operating during a calculating process of the differential actuating mechanism, of the coupling mechanism for transferring values from the differential actuating mechanism to the accumulator as well as the arrangement of the locking rail for the tens preparatory slides.

Figure 22 shows a perspective view taken from the front right-hand side of the machine of the controlling elements of the carriage shifting device.

Figure 23 shows a detail of Figure 22 in which the parts for the sake of clearness are represented separated out of another.

Figure 24:
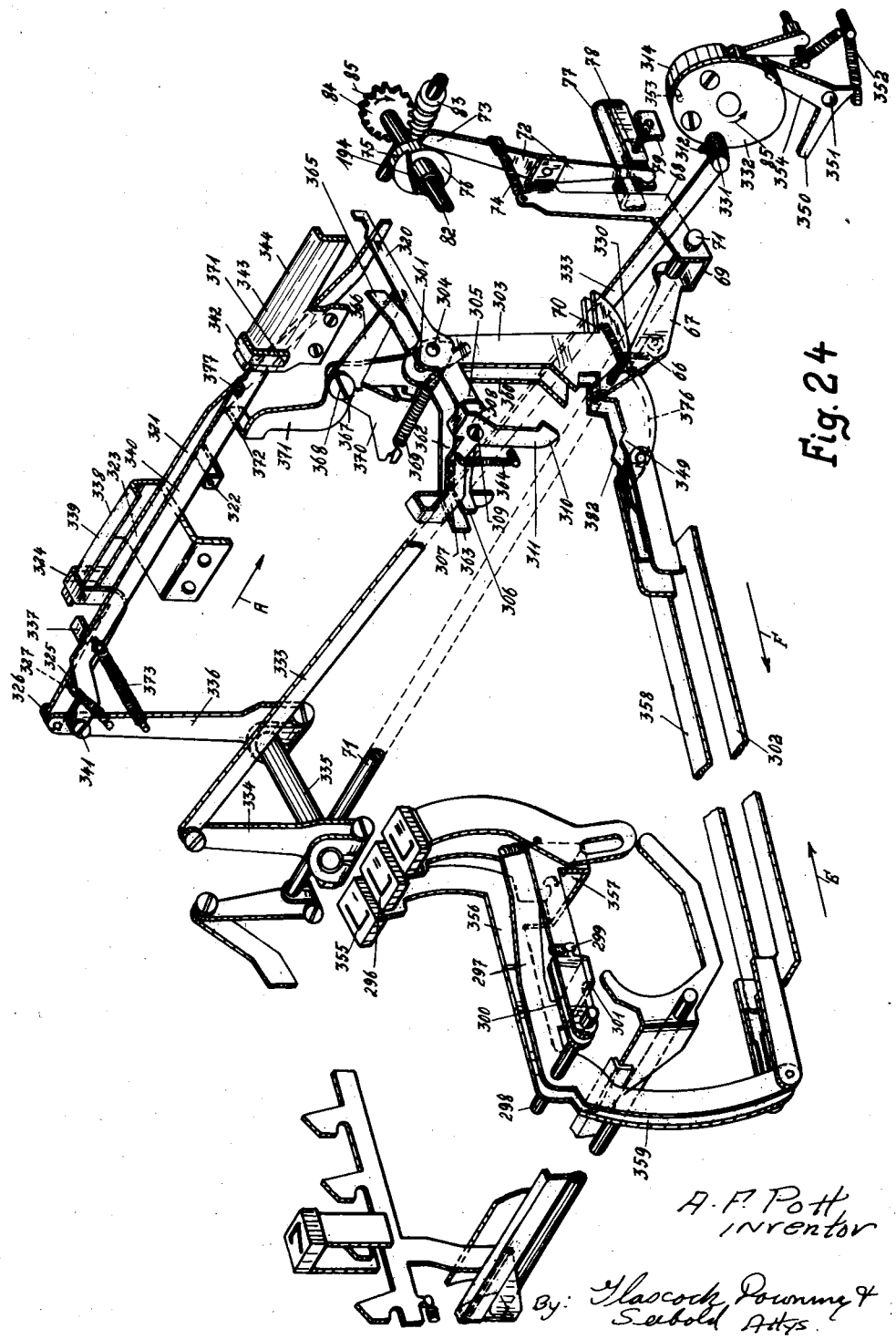

Figure 24 shows a perspective view, taken from the right hand front of the machine, of the keys for the accumulator and revolution counter clearing device in which the clearing clutch for the sake of clearness is drawn out of its true position towards the right.

Figure 25 shows a longitudinal section through the carriage and along the lines 25a—25a, 25b—25b and 25c—25c in Figure 28 viewed in the direction of the arrow "D".

Figure 26 is a perspective of a part of the amount storing means as well as the clearing device for the same and the accumulator, viewed from the front on the left hand side of the machine.

Figure 27 shows in perspective a detail of Fig. 26.

Figures 1, 2:
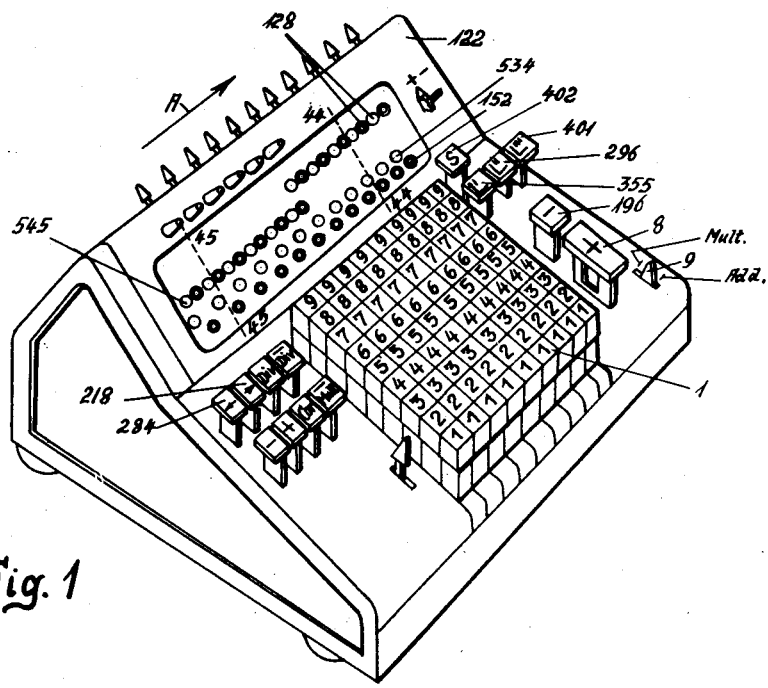
Fig. 1 shows an elevation in perspective of a calculating machine with which the invention by way of example is designed to be incorporated.
Figure 2 shows a view of the main drive shaft with the carriage shift clutch, the clutch for the differential actuating mechanism and the clearing clutch, viewed in the direction of the arrow A, shown in Figure 1.

Figure 28 shows a centre section through the machine according to Fig. 1, in which various parts located on the left hand side for the sake of better comprehension, are represented with dotted lines and the amount storing means is represented in its inoperative position.

Figure 29:
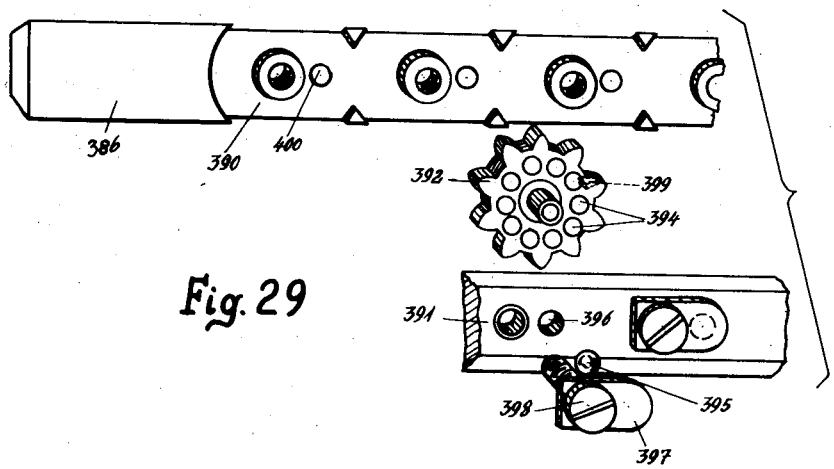

Figure 29 shows in perspective the individual elements of the amount storing means drawn out from one another and viewed in the same direction as in Fig. 26.

Figure 30:

Figure 30 shows in perspective a detail of Fig. 29.

Figure 31:
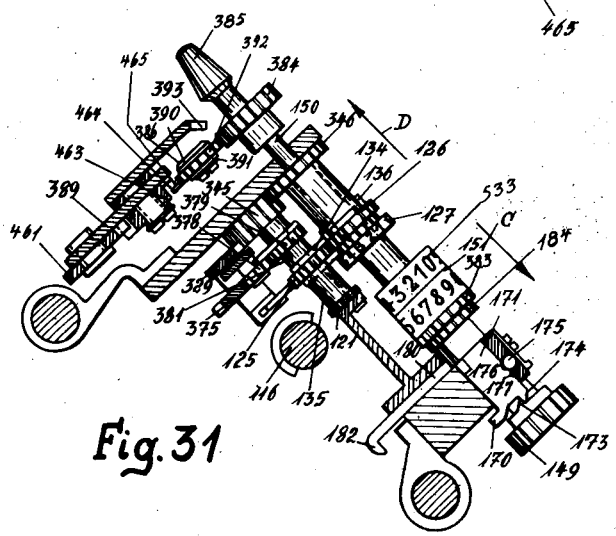

Figure 31 shows a part section according to Fig. 28 with the amount storing means, however, in the working position.

Figure 32 shows perspective of the shift mechanism arranged within the machine on the right hand side for the amount storing means and accumulator, the mechanism being in that rest position in which no value is present in the amount storing means.

Figure 33 is similar to Fig. 32, but in that position in which a value is contained in the amount storing means.

Figure 34 shows in perspective the group of levers indicated in Figs. 32 and 33, the levers being drawn out from one another for purposes of illustration.

Figure 35:
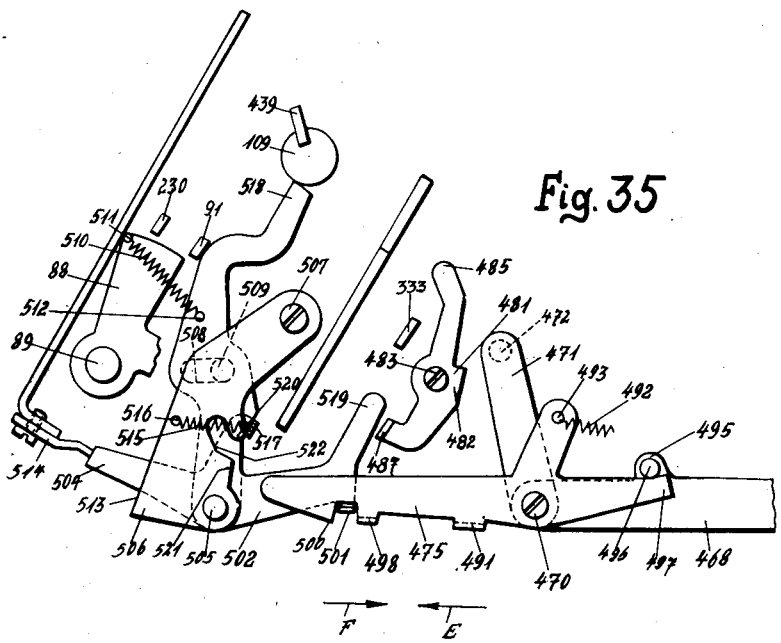

Figure 35 shows a side elevation of the device illustrated in Figs. 32 and 33, the position of the parts being somewhat changed.

Figure 36:
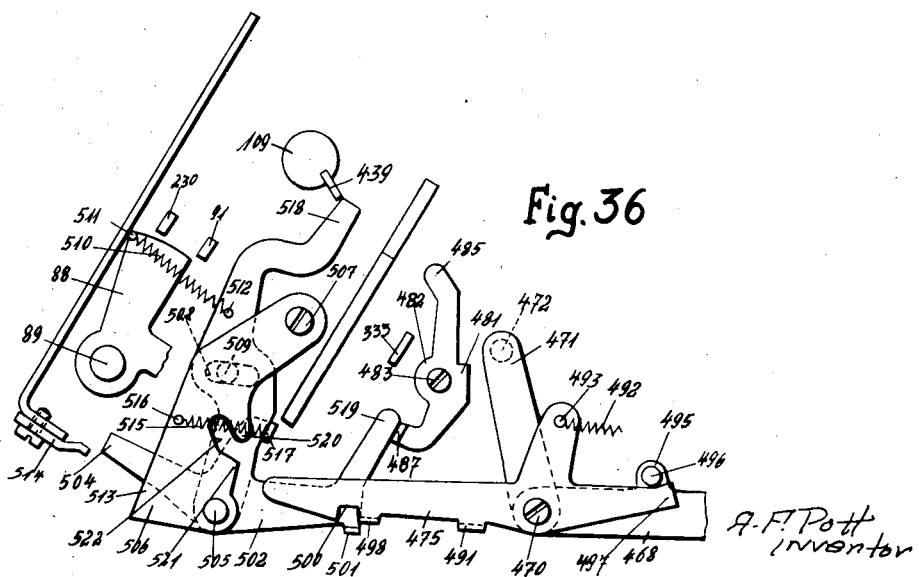

Figure 36 shows the same view as Fig. 35 at the instant, however, in which after depression of the total key, the drive connection between this and the control mechanism of the shift mechanism coupling is released through the drive movement of the same.

Figure 37:
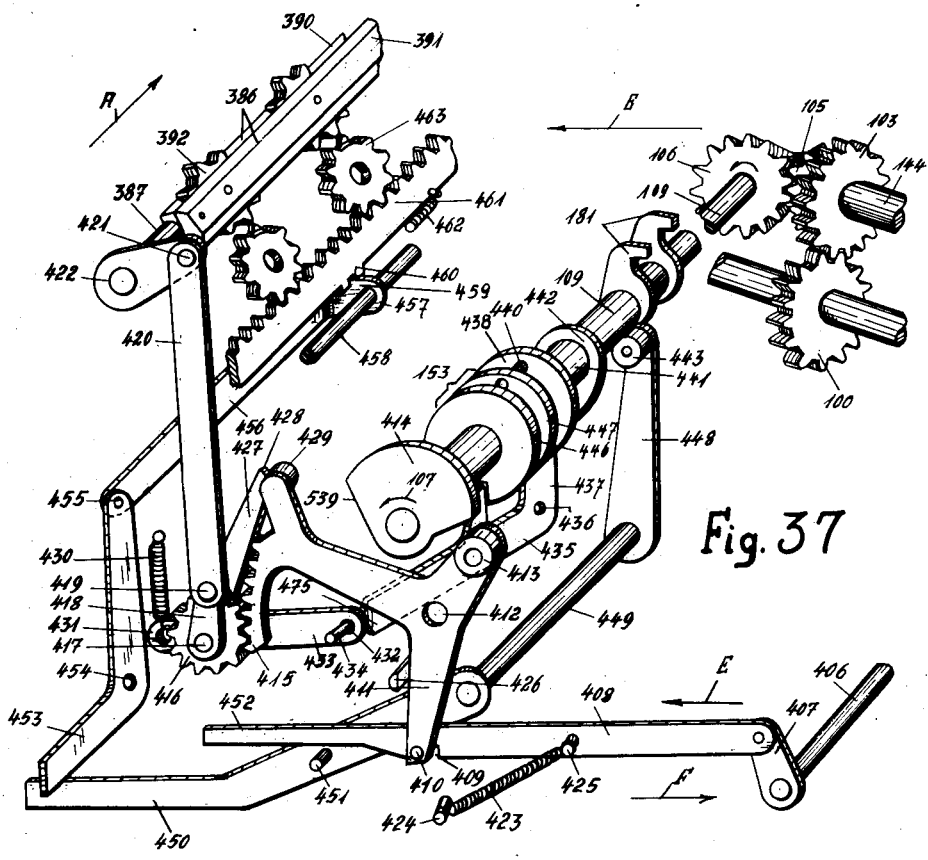

Figure 37 shows a perspective representation of the parts arranged within the machine on the left hand side and viewed from the front left hand side of the machine.

Figure 38:
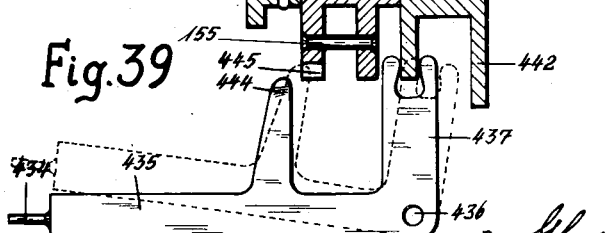

Figure 38 shows in perspective a detail of Fig. 37.

Figure 39:
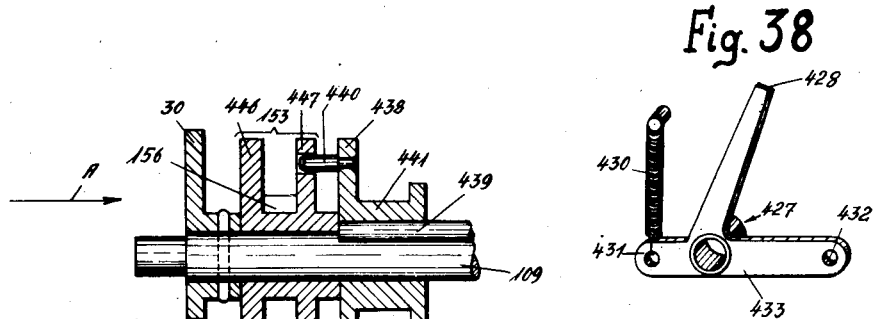

Figure 39 shows a fragmentary longitudinal section of some details of Fig. 37.

Figure 40:
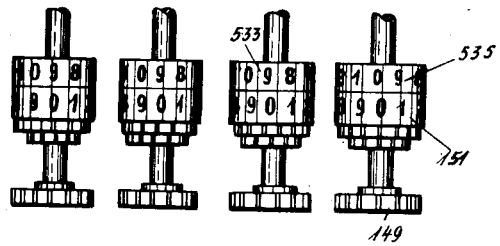

Figure 40 shows the arrangement of a complementary numeral wheel set adjacent to the numeral wheels of the accumulator.

Figure 41:
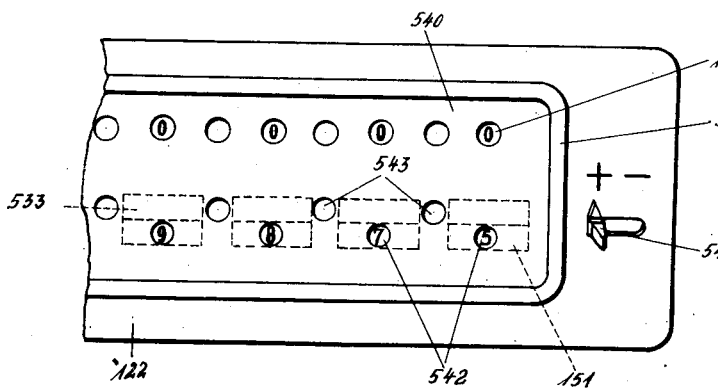
Figure 42:
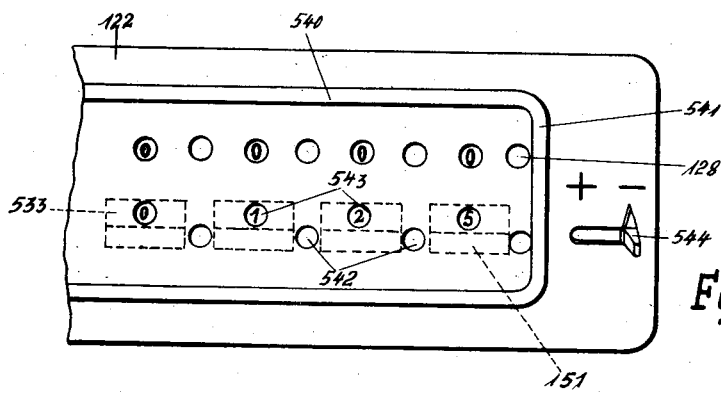

Figures 41 and 42 show an arrangement for the selective exposure of both numeral wheel sets.

Figure 43:
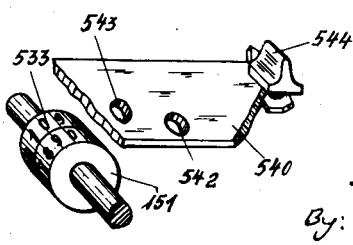

Figure 43 shows in perspective a detail of Figs. 41 and 42.

Figure 44 shows a section through the revolution counter and accumulator according to the line 44—44 of Fig. 1 and viewed in the direction of the arrow A.

Figure 45 shows a section through the multiplier setting mechanism and accumulator according to the line 45—45 in Fig. 1, and viewed in the direction of the arrow A.

Figures 46 to 49 show diagrammatically the individual carriage positions in the transference of a value from the revolutions counter by means of the accumulator and of the amount storing means in the multiplier setting mechanism.

Figure 50:
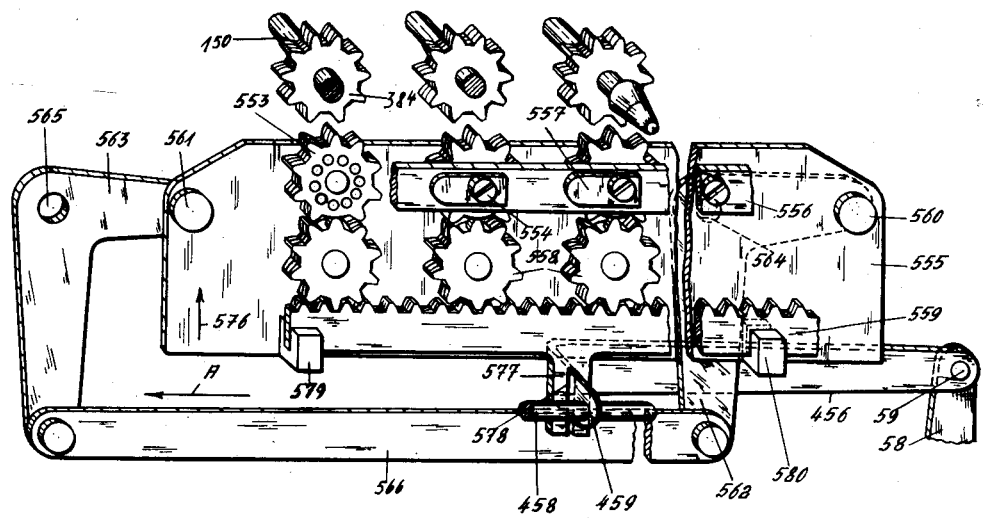

Figure 50 shows in perspective another form of amount storing means seen from the rear left-hand side of the machine.

Figure 51:
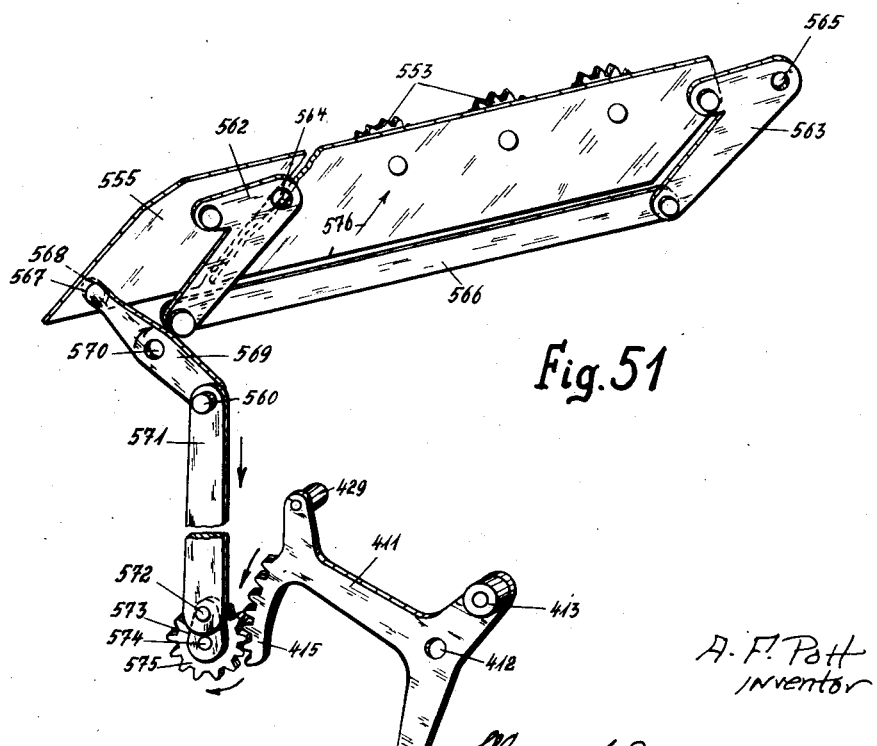

Figure 51 shows in perspective the operating means for the embodiment shown in Fig. 50, viewed from the front left hand side of the machine.

Figures 52 to 63 show views and details of another embodiment of amount storing means which permits to transform a value, contained in the same into its complementary value and for transferring the same to the accumulator.

Figure 52:
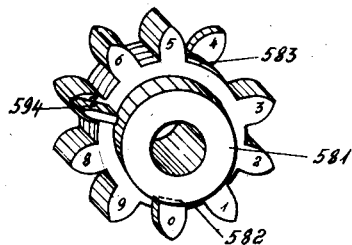

Figure 52 shows in perspective a wheel of the amount storing means.

Figure 53:
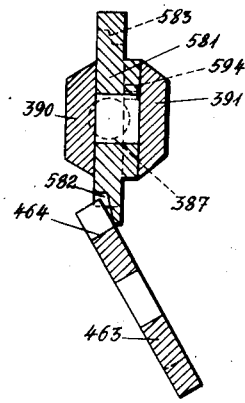

Figure 53 shows a sectional side view of the wheel in Fig. 52 with its associated clearing wheel.

Figure 54:
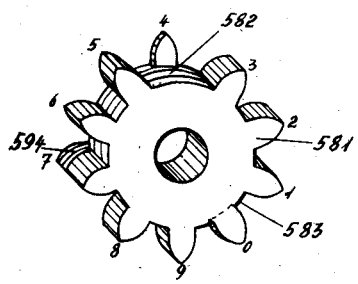

Figure 54 shows in perspective the same wheel as in Fig. 52 but viewed from the other side.

Figure 55:
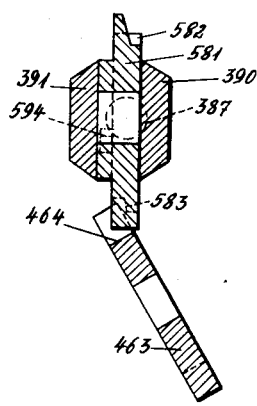

Figure 55 shows a sectional side view of the wheel in Fig. 54 with its associated clearing wheel.

Figure 56:
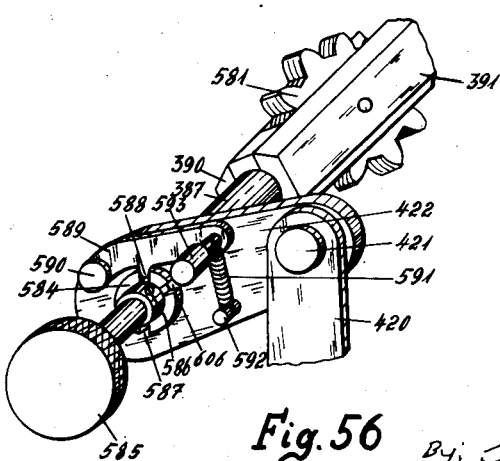

Figure 56 shows in perspective a device for rotating the amount storing means through a certain angle and through an angle of 180°.

Figure 57:
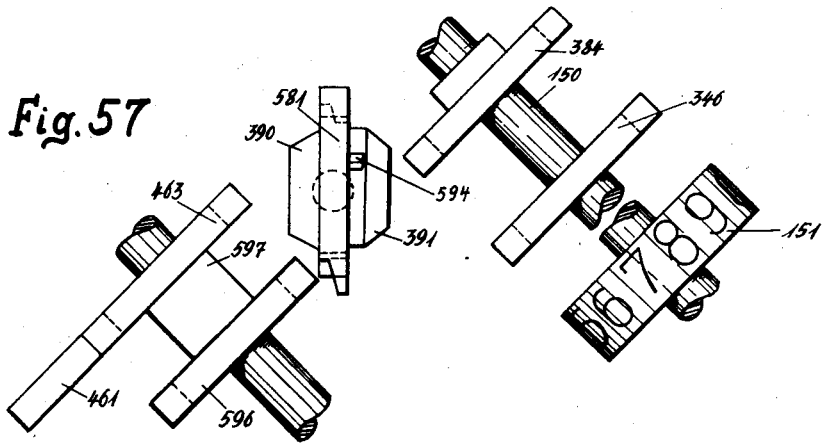

Figure 57 shows a wheel of the amount storing means in its inoperative position with regard to its appertaining clearing wheels and its appertaining wheel on the numeral wheel shaft.

Figure 58:
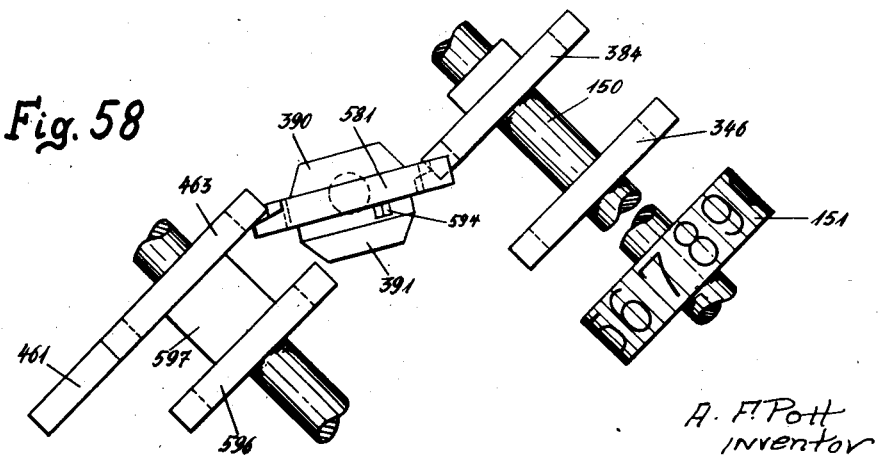

Figure 58 shows the same view as in Fig. 57, but with the wheel of the amount storing means in its operative position.

Figure 59:
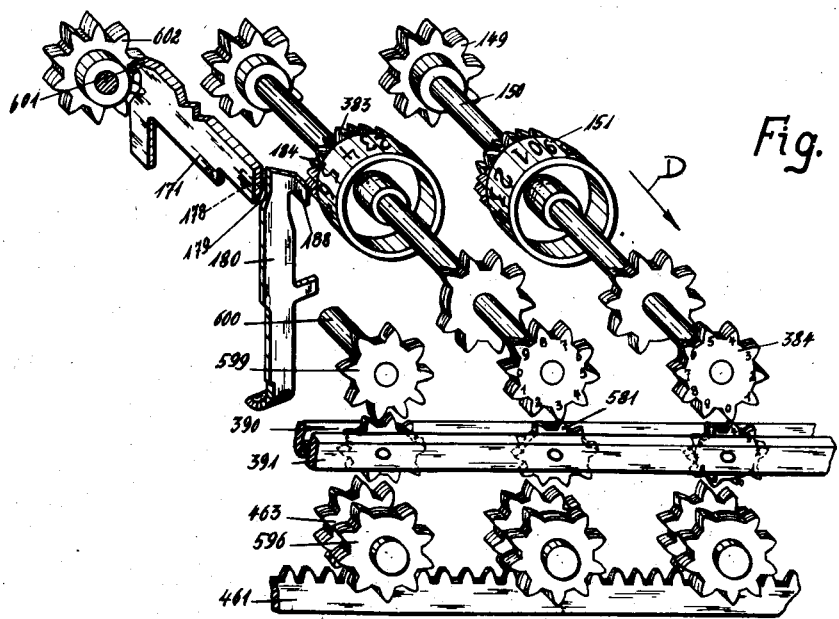

Figure 59 shows in perspective the three right hand wheel sets of the accumulator and the amount storing means as viewed from the rear of the machine, wherein the numeral wheel of the units denomination of the accumulator shows the value "3".

Figure 60:
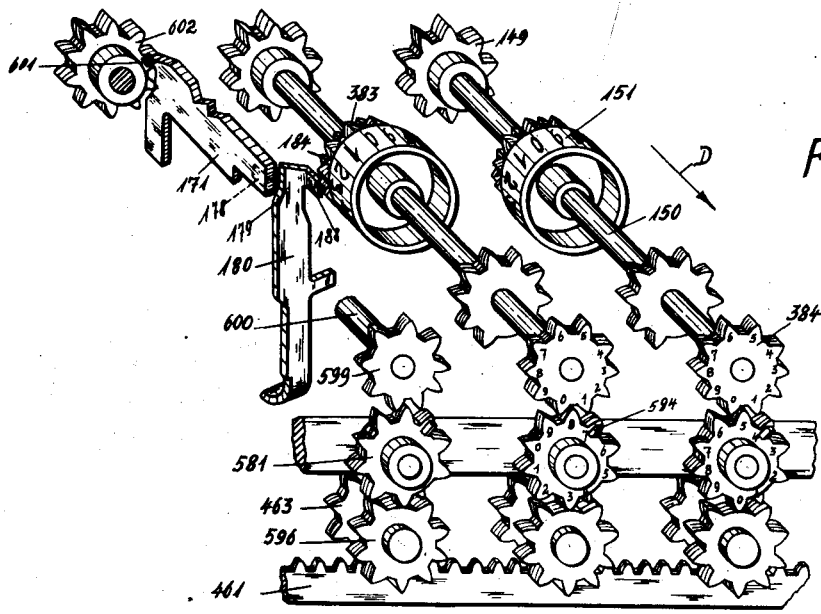

Figure 60 shows the same view as Fig. 59, wherein however the value "3" of the numeral wheel of the units denomination of the accumulator has been transferred to its appertaining wheel of the amount storing means, whereas all remaining wheels of the same are positioned at zero.

Figure 61 shows the same view as Fig. 60, wherein, however, the amount storing means has been rotated through 180° according to which the wheel of the units denomination of the amount storing means is so positioned that if it would be cleared, it would transfer the complement of the value "3", namely "6" to its appertaining numeral wheel of the accumulator and all remaining wheels of the amount storing means would transfer the complement of the value "0", namely "9".

Figure 62 shows the same view as Fig. 57, wherein however the wheel of the amount storing means assumes another inoperative position.

Figure 63 shows the same view as Fig. 62, wherein, however, the wheel of the amount storing means is in operative position with its second clearing wheel, so that the wheel of the amount storing means may be cleared without transferring its value to its appertaining numeral wheel of the accumulator.

The invention hereinafter described is intended to be incorporated by way of example in the well known Mercedes Euklid calculating machine model 28, set forth in the above mentioned Patent No. 2,143,741.

For the sake of a better understanding of the present invention, it is advisable to briefly set forth the operation of said machine as described in the beforementioned patent application under the following sub-headings entitled "Addition", "Subtraction". Carriage shift movement to the right, Carriage shift movement to the left, Clearing mechanism for the accumulator and Clearing mechanism for the revolution counter.

Addition

For the purpose of performing addition, first, the value is set on the key board 1, Figures 1, 21 and 28 whereby the setting wheels indicated with 2 to 6, are brought into engagement with racks 7 of the differenetial actuating mechanism.

Figure 15:
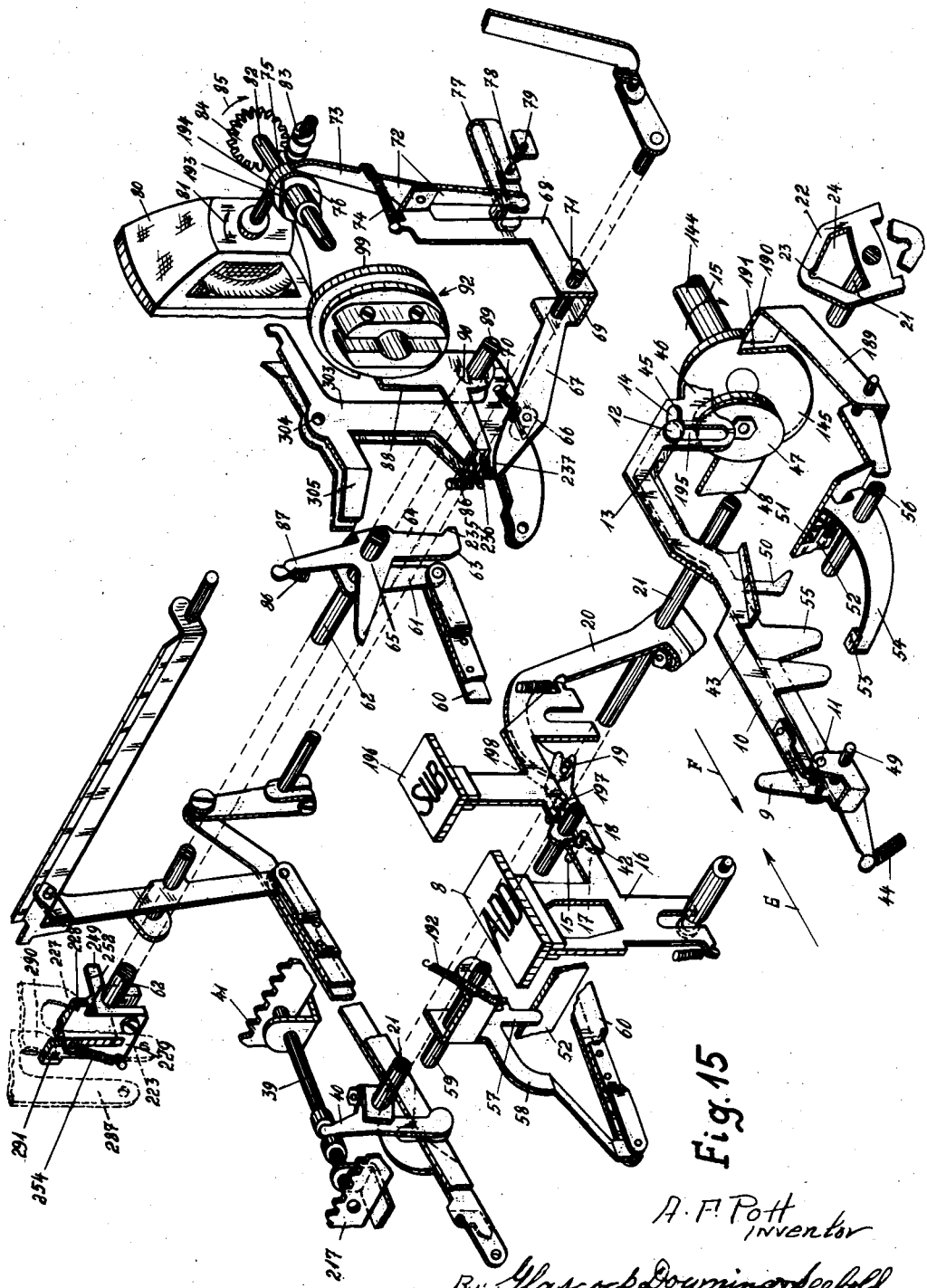
Figure 15 shows a perspective view of the machine taken from the front right-hand side of the mechanisms, controlled by the addition and subtraction keys together with the motor contact and a part of the driving motor in which the parts for the sake of clearness are represented separated out of one another.

In order now, on the depression of the addition key 8, Figure 15, to obtain in each case only one cycle of operation of the machine, the lever 9 is first swung out of the position illustrated in Figure 15, into the position represented in Figure 1, consequently on to the mark "Add.". Thereby, the rod 10 jointed to the lever 9 by means of the pin 11 is displaced in the direction to the arrow "F", whereby the pin 12 of the rod 13 extends into the closed end of the slot 14 so that in a downward movement of the rod 13, the rod 10 is also taken downwards along with it. If the setting of the lever 9 on the mark "Add." (Fig. 1) is effected the addition key 8 is depressed.

In the depression of the same, Figure 15, the pin 15 riveted on the stem 16 acts on the face 17 of the shift lever 18 and swings the same in the anti-clockwise direction into the position represented in Figure 15. Thereby the shift lever 18, the fork-shaped end of which embraces the pin 19 swings the lever 20, rigidly mounted on the shaft 21 in the clockwise direction, and therefore also the shaft 21. The control lever 22 likewise rigidly mounted on the shaft 21 is thereby swung in the clockwise direction whereby the notch 23 (Fig. 16) of the recess 24 acts on the riveted pin 25 of the part 26. As a result, the pin 27 of the bar 26 and the edge 28 of the recess 29 move in relation to one another. Furthermore, the recess 29 is made so great that the pin 27 and the edge 28 cannot interfere with one another. The control lever 22 now displaces through its swinging movement in the clockwise direction, the bar 26 in the direction of the arrow "E" Figures 15 and 7. This swings in turn the angle lever 30 in the anti-clockwise direction round the screw 31 whereby the draw key 32, 33 is displaced so far to the right that its nose 33 enters the groove 34 (Fig. 5) of the toothed wheel 35 and couples therefore the latter with the draw key sleeve 36, on which the wheel 37 is fixed whilst the toothed wheel 38 may then run idly on the draw key sleeve 36. Thus, the reverse gearing for the revolution counter is shifted to addition.

In the rotation of the shaft 21, Figure 15, in the clockwise direction, the coupling pin 39, by means of the lever 40 is displaced in the direction of the arrow E whereby the rack 41 is blocked, and therefore the differential actuating mechanism is set for additive operation according to Figure 15.

Figures 4, 5:
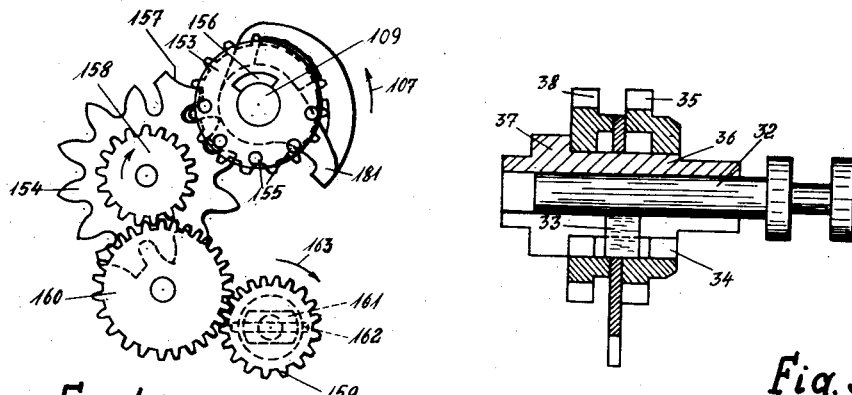
Figure 4 shows a partial side elevation according to Figure 3.
Figure 5 shows a section through the change gear for the tens carrying shaft of the revolution counter on an enlarged scale.
Figures 6, 7:
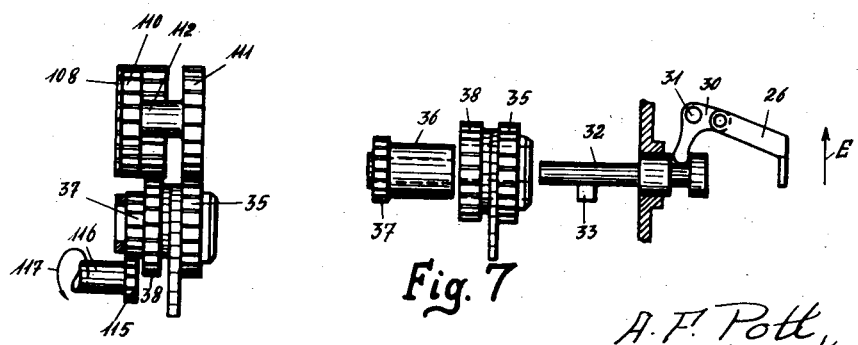
Figure 6 shows a schematic plan of the reverse gearing for the tens carrying shaft of the revolution counter, in which the shafts of the wheels for the sake of clearness are represented in substantially one plane.
Figure 7 shows a draw key clutch for the reverse gearing of the tens carrying shaft of the revolution counter in which the different parts for the sake of clearness are separated out of one another.

During the coupling of the toothed wheel 35 Figures 5 and 7 with the draw key sleeve 36 and the coupling of the rack 41 by means of the pin 38 on the depression of the addition key 8 Figure 15, the pin 42 riveted on the stem 16 acts on the upper edge 43 of the lever 13 and swings the same against the action of the spring 44 in the clockwise direction, whereby the pin 12 acts on the face 45 of the slot 14 of the lever 10. The lever 10 is consequently also swung in the clockwise direction and of course round the pin 11 so that the part 46 reaches into the path of movement of the connecting rod head 47 of the connecting rod 48.

In the swinging out of the lever 13 Figure 15 in the clockwise direction, round the pin 49, the projection 50 of the lever 13 is positioned in front of the edge 51 of the key locking bar 52. On the lug 53 of the lever 54 the projection 55 of the lever 13 acts whereby the lever 54 is swung in the anti-clockwise direction round the shaft 56. In this swinging movement, also, the key locking bar 52 takes part without being prevented by the projection 50. This locking bar remains then with a small amount of play distant from the projection 50 and acts on the lug 57 of the lever 58, whereby this is swung in the clockwise direction round the shaft 59. Thereby the connecting rod 60 jointed to its downwardly directed limb is displaced in the direction of the arrow "F" and consequently the lever 61 jointed to it, swings round the shaft 62 in the clockwise direction, whereby the face 63 of the arm 64 of the three-armed lever 65 acts on the roller 66 of the lever 67 and this as well as the lever 68 connected to it by means of the bridge 69 swings against the action of the spring 70 in the anti-clockwise direction round the shaft 71 whereby the contact lever 72 is displaced in the direction of the arrow "F" and the arm 73 of the lever 72, which normally through the action of the spring 74 is brought into contact with the conical periphery 75 of the cam 76, slips off from the same. The contact lever 72 can now, under the action of the spring 74, swing in the anti-clockwise direction, whereby under the action of the contact spring 77 the motor contact 78 and 79 is closed. The motor 80 now commences to run in the direction of the arrow "81" and rotates the main driving shaft 82 by the worm 83 disposed on the motor shaft through the worm wheel 84 in the direction of the arrow 85. The spring 86 engaging with arm 87 of the lever 65 swings then the coupling lever 88 and the shaft 89 in the direction of the arrow 90 (Fig. 2) whereby the nose 91 (Fig. 8) of the coupling 92 for the differential actuating mechanism is released. The clutch pawl 93 under the action of its spring 94 is thereby operated so that its nose 95 is brought into engagement with the tooth 96 of the clutch cam 97, fixed to the driving shaft 82, whereby the cam 97, the pawl 95 and therefore also the clutch housing 92 in which the pawl 95 is mounted by means of the pin 98 are carried along in the direction of the arrow 85. The clutch lever 88 is prevented from making a backward movement by the cam 99 (Fig. 2) of the clutch 92, so that an eventual swinging of the clutch lever 88 in the opposite direction to the arrow 90 is prevented. The toothed wheel 100 Figure 2, which is in rigid connection with the clutch 92 by means of the screws 101 and the hub 102 provided on the toothed wheel 100 is thus rotated in the direction of the arrow 85.

Figure 3:
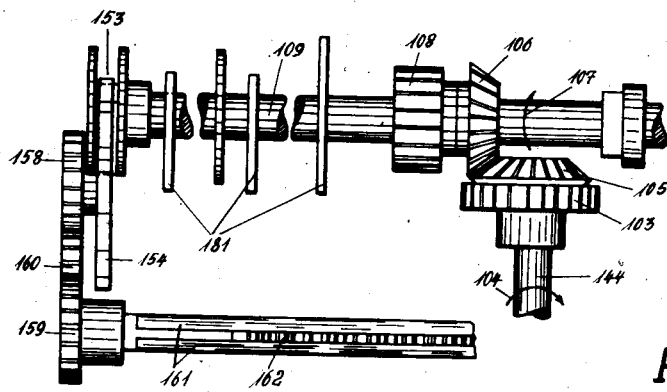
Figure 3 shows a plan of the coupling mechanism for transferring the values set up in the keyboard from the differential actuating mechanism to the numeral wheels of the accumulator together with the tens carrying shaft for the latter and the driving parts for the tens carrying shaft.

The spur wheel 103 Figures 2 and 3, which is disposed vertically over the toothed wheel 100 and engages with it, is thus rotated in the direction of the arrow 104 (Figures 3 and 2). As the bevel wheel 105 formed on the spur wheel 103 engages with the bevel wheel 106, this is rotated in the direction of the arrow 107. In this rotation, the spur wheel 108 (Figures 3 and 6) rigidly mounted on the shaft 109 likewise participates. This transmits the rotational movement through the toothed wheel 110 (Fig. 6) and through the toothed wheel 111 rigidly connected with the latter by means of the sleeve 112 to the toothed wheel 35 which, as formerly mentioned, in the depression of the addition key 8 is coupled through the draw key 32, 33 with the draw key sleeve 36 so that consequently also the toothed wheel 37 rigidly connected with the same, rotates in the direction of the arrow 114 (Fig. 2). As this in turn is in engagement with the toothed wheel 115 Figure 7, fixed to the tens carrying shaft 116 of the revolution counter so the tens carrying shaft 116 rotates in the direction of the arrow 117, Figures 2, 7 and 11. Thereupon, the inclined face 118 Figures 11, 12 and 14, of the lug 119 acts on the tooth 120 Figure 11 of the star wheel 121 Figures 11 and 13, positioned furthest to the right in the carriage 122 (Fig. 1) and rotates the star wheel 121 in the direction of the arrow 123 Figure 11 to the position of the tooth 124 for a complete division. Immediately after this rotational movement, the transport piece 118 enters into the toothed space lying opposite to it of the star wheel 121 whereby the same is secured against further rotation. By means of this rotational movement of the star wheel 121 through one division, the toothed wheel 125 Figure 13 standing in fixed relation with the star wheel 121, likewise rotates in the direction of the arrow 123 and as the toothed wheel 125 is in engagement with the toothed wheel 126 (Fig. 13) fixed to the numeral wheel 127 of the revolution counter 128 (Fig. 1), the toothed wheel 126 and the numeral wheel 127 rotate in the arrow direction 129 that is to say in the additive sense for a whole unit. Towards the end of the rotation of the tens carrying shaft 116, the subtraction lug 130 (Figures 11 and 12) is pressed back against the action of its spring (not shown) by the tooth 126 which now is in the position of the tooth 124. A rotation of the star wheel 121 can hereby, however, not take place in consequence of the positive guiding given by the notch 131 and the transport piece 132.

If now the numeral wheel 127, situated furthest to the right of the revolution counter has arrived at the value "9" and rotates from "9" to "0", a tens transference to the numeral wheel 133, disposed close to the left must take place. This happens in the following manner.

Figure 11:
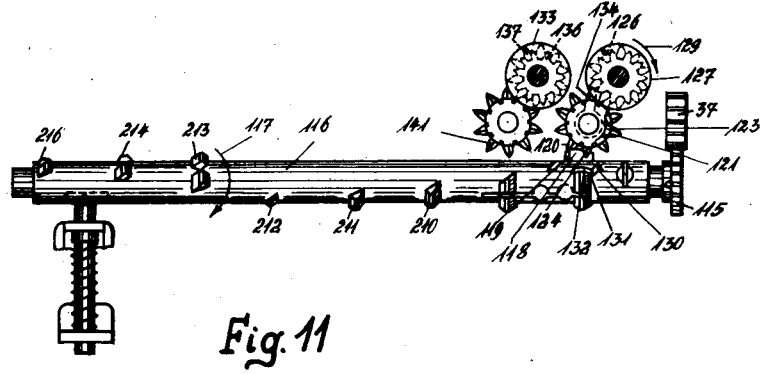
Figure 11 shows a front view of the tens carrying shaft for the revolution counter.
Figure 12:
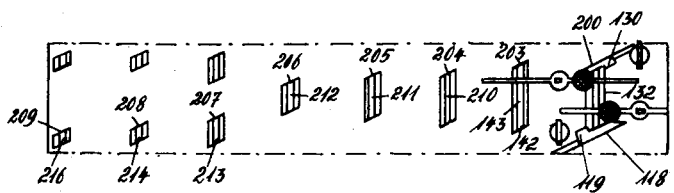
Figure 12 shows the development of the periphery of the tens carrying shaft according to Figure 11.
Figure 13:
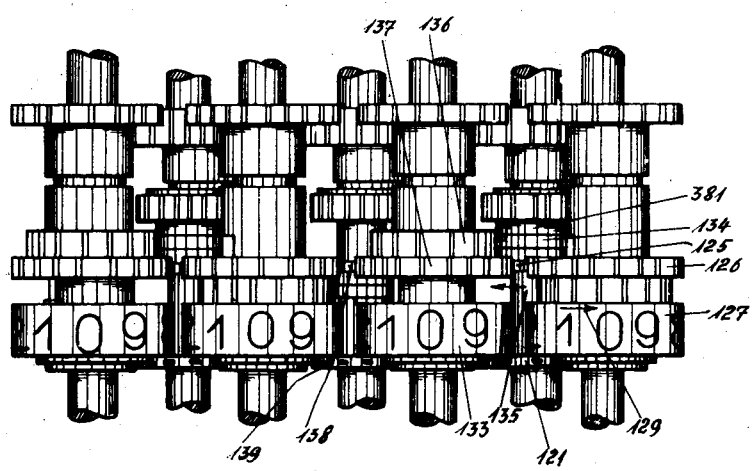
Figure 13 shows a plan of the numeral wheels of the revolution counter on an enlarged scale for the purpose of better illustration of the individual mechanism.
Figure 14:
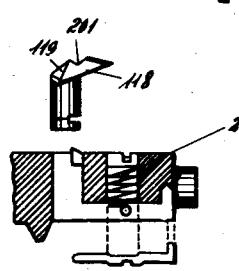
Figure 14 shows a detail of the arrangement according to Figure 11 likewise on an enlarged scale.

In the change from "9" to "0" of the numeral wheel 127 disposed furthest to the right, a shift nose 134 Figures 11 and 13 fixed on a sleeve 135, Figure 13 acts on the toothed wheel 136, which is rigidly connected with the next higher numeral wheel 133. The numeral wheel 133 has, thereby, however only been rotated through one half-unit and likewise the toothed wheel 137 rigidly connected with the numeral wheel 133. As the toothed wheel 137 is in engagement with the toothed wheel 138 which is rigidly connected with the star wheel 139 belonging to the next higher place, the latter is also rotated through one half-unit. In this position set on the half division, the star wheel 139 is held by a double tooth pawl 140 Figure 25 engaging the tooth space of the toothed wheel 138. In this rotation of the star wheel 139 for half a unit, the tooth 141 (Fig. 11) of the same enters the rotational path of the inclined surface 142 Figure 12 of the transport piece 143 whereby in the rotation of the tens carrying shaft 116 the star wheel 139 as well as the numeral wheel 133 are rotated through the lacking half-unit. In a similar manner, naturally, the tens transfer to each next higher numeral wheel is effected.

Since now the drive of the revolution counter 128 on the depression of the addition key 8 has been described, the drive of the differential actuating mechanism will be shortly explained. As above mentioned, on the depression of the addition key 8, the wheel 103 Figures 2 and 3 and thereby also the shaft 144 rotate in the direction of the arrow 15 whereby through the crank disc 145 (Fig. 21) which is fixed to the shaft 144 and the connecting rod 46 jointed to the crank disc and indicated by "39" in U. S. Patent 1,011,617, the proportional lever (not illustrated) is swung out, which moves the differential actuating mechanism 7.

The movement of the proportionally moved racks of the differential actuating mechanism are transmitted to the shafts 147 through the intermediary of the wheels 2 to 6, set by the keys 1. Accordingly, also the wheels 148 fixed on these shafts rotate forwards and backwards corresponding to the value set. In order to transfer only the forward rotation to the toothed wheels 149 (Figure 21) of the numeral wheel shafts 150 and thus to the numeral wheels 151 of the accumulator 152 (Fig. 1), a coupling is introduced between the wheels 148 and the wheels 149 the operation of which coupling will be shortly explained in the following:

On the left hand side of the machine, on the shaft 109 Figure 3, the pin wheel 153 is rigidly mounted, which corresponding to the rotation of the shaft 109 is likewise rotated in the direction of the arrow 107. The pin wheel 153 now rotates the Maltese cross 154 by means of the pins 155 (Figure 4) so far in the direction of the arrow 107 until the locking curve 156 of the pin wheel 153 acts on the locking curve 157 of the Maltese cross 154. In this rotation the toothed wheel 158 formed on the Maltese cross 154, the toothed wheel 159 standing in engagement with the toothed wheel 160 also take part. Then the frame 161 carrying the coupling wheels 162 Figures 3 and 21, rigidly connected with the toothed wheel 159 is rotated in the direction of the arrow 163 whereby the coupling wheels 162 engage with the driving toothed wheels 148 Figure 21 and the accumulator toothed wheels 149. After this drive connection has been established the racks of the differential actuating mechanism 7 transfer the value through the shafts 147, wheels 148 coupling wheels 162 and wheels 149 to the numeral wheels 151 of the accumulator 152.

During the swinging movement of the coupling wheel frame 161 the nose 164 (Figure 21) rigidly connected with it, has released the lever 165 whereby the same in consequence of its own weight rocks in the clockwise direction. Thereby its lug 166 releases the ledge 167 of the resetting or locking flap 168 so that the same swings in anti-clockwise direction round its pins 169 (only the right one is shown) and unlocks the finger 170 of all the preparatory members 171 of the tens transfer mechanism for the accumulator 152.

After these operations have taken place, the value transference to the wheels 149 of the numeral wheel shafts 150 is effected by the wheels 148 through the coupling wheels 162 whereby naturally also the numeral wheels 151 are correspondingly rotated and, of course, in the direction of the arrow 172 (seen in Figure 21).

In this value transference, as soon as one of the numeral wheels 151 rotates from "9" to "0", the tens carrying nose 173 (Fig. 28) of the toothed wheel 149 acts on the inclined face 174 of the preparatory member 171 and displaces the same in the direction of the arrow D. This displacement of the preparatory member 171 takes place unimpeded in consequence of the preceding release of its finger 170 (Figure 21) by the resetting or locking flap 168. In the displacement of the preparatory member 171 in the direction of the arrow D, the ball 175 is disengaged from the stop 176 and engaged in the stop 177 whereby the preparatory member 171 is blocked in its new position.

By means of this process, the edge 178 (Fig. 19) of the preparatory member 171 has entered into the path of movement of the inclined edge 179 of the tens carrying member 180 (Fig. 20).

As soon as the value transference has been effected, the coupling wheel frame 161 is rotated further in the direction of the arrow 163 (Figures 4 and 21), whereby the coupling wheels 162 are again disengaged from the wheels 148 and 149. Meanwhile, however, the shaft 109 with the eccentrics 181 (Figures 3, 4 and 37) rigidly connected with it has rotated so far in the direction of the arrow 107 that the eccentric 181 arranged in the units position acts on the foot 182 (Fig. 20) of its tens carrying member 180 and raises the same. Insofar now as the appertaining preparatory member 171 has not been displaced in the direction of the arrow D, the tens carrying member 180 is raised merely vertically without producing any effect.

If, however, the above described displacement of the preparatory member 171 has taken place in the tens position the edge 178 Figure 19 of the preparatory member 171 is disposed in the path of the inclined edge 179 of the appertaining tens carrying member 180. As soon now as the eccentric 181 arranged in the tens position acts on the foot 182 of the tens carrying member 180, the latter is raised and strikes with its inclined edge 179 on the edge 178 of the preparatory member 171. Accordingly, the upper end of the tens carrying member 180 is moved to the right in Figure 19 whereby its lug 183 engages with the toothed wheel 184 of the next higher numeral wheel 151 and rotates the same for one unit. After the toothed wheel 184 has been shifted through one unit, the eccentric arranged in the hundreds position comes into operation and raises the corresponding tens carrying member 180 upwards. If all the eccentrics 181 have now come into operation on their tens carrying members 180, the latter are held for a short time in their raised positions under the action of the concentric part of the eccentrics 181. Meanwhile, the coupling wheel frame 161 has rotated so far in the direction of the arrow 163 that now the nose 185 (Figure 21) of the same acts on the lever 165 and swings the latter round its pivot point 186 in the clockwise direction Figure 21. The lever 165 strikes then on the bar 167 of the resetting or locking flap 168 and swings the same round its pins 169 in the anti-clockwise direction. The resetting or locking flap 168, now comes into contact with the fingers 170 of the previously displaced preparatory members 171 and displaces the same in the direction of the arrow C to their rest position. The balls 175 (Fig. 28) are then disengaged from the stops 177 and engaged in the stop 176 and the resetting or locking flap 168 acts again as a locking flap so that all the preparatory members 171 are secured against movement in the direction of the arrow D.

As soon now as the preparatory members 171 have again taken up their rest position, their edge 178 have released the tens carrying members 180 and the latter under the action of their springs 187 (Fig. 18) are enabled to swing to the left in Fig. 19 whereby their lugs 183 (Fig. 20) are disengaged from the wheels 184. Only then, the eccentrics 181 release simultaneously all their tens carrying members 180 so that the same under the action of their springs 187 can descend vertically to their rest positions.

As already described, the lever 13, Figure 15, is swung on depression of the key 8 against the action of its spring 44 in the clockwise direction. As through the parts 53, 54, 52, 58, 60, 61 and 88, the clutch 92 for the differential actuating mechanism is closed and through the parts 66, 67, 68 and 72, the motor contact 78, 79 is closed, these parts naturally remain closed as long as the key 8 is held depressed, which has the result that the amount set unintentionally is transferred a number of times to the accumulator. In order to avoid this, precautions must be taken that also in the holding down of the key 8, the machine makes one revolution only. With this object in view, the levers 13 and 10, are so positioned that they after approximately half a rotation of the crank disc 145 (Fig. 15) are pushed to the right by the connecting rod 48 and, of course, so far that they, under the pull of the spring 44, engaging with the lever 13 can rise so high laterally of the pin 42 of the key stem 16 that the projection 50 of the lever 13 contacts with the edge 51 of the key locking bar 52. If the key 8 by mistake is freed and again depressed, so it remains inoperative on the lever 13 as it cannot be engaged by its pin 42.

As soon now as the lever 189 Figures 15 and 21, can again engage with its nose 190 in the groove 191 of the disc 145, the key locking bar 52 is able, under its own weight and by the action of the spring 44 through the projection 50 and of the spring 192 through the projection 57, to return to its rest position, whereby the parts 58, 60, 61, 65 and 88, also return to their rest position. Thereby, the clutch lever 88 comes again into the path of the nose 91 (Fig. 8) of the clutch pawl 93, so that the same while striking with its nose 91 against the clutch lever 88 disengages the clutch after one rotation.

When the face 63 (Fig. 15) of the arm 64 of the three armed lever 65 has released the roller 66, the parts 67, 68 and 72 return also to their rest position under the action of the spring 70 as soon as the lever 72 at a suitable moment slides on to the curve 76 at 193. When this is effected, the curve 194 swings the lever 72 in the clockwise direction, whereby the contact spring 77 is pressed together, and the contact 78, 79 is opened, so that the motor 80 again comes to rest. If the curve 194 has swung out the lever 72 completely, it slides under the action of the spring 74 again on to the conical periphery of the cam 75.

On the release of the addition key 8, the lever 13 under the simultaneously laterally acting spring pull of the spring 44 slides again underneath the pin 42 of the key stem 16. The value set in the keyboard therefore appears in the accumulator 152 and in the revolution counter 128 a "1" is visible.

If however, for purposes of multiplication, it should be desired to transmit the value set in the keyboard 1 several times to the accumulator 152, the lever 9 (Figs. 1 and 15) is set to the mark "Mult." which position is illustrated in Fig. 15.

Owing to that position, the lever 13 appears displaced in the direction of the arrow E so that the pin 12 is only in the vertical slot 195. If therefore the addition key 8 is depressed, the pin 42 of its stem 16 acts on the edge 43 of the lever 13 and swings the same down without taking the lever 10 along with it. Accordingly, the part 46 of the lever 10 is not brought in the path of movement of the head 47 so that the lever 13 is not disengaged from pin 42. Consequently, multiplication is performed by accumulated addition as long as the addition key 8 is held depressed.

Subtraction

The operations in subtraction are substantially the same as in addition. They are differentiated only from addition in this: that in the depression of the subtraction key 196, (Figure 15) the pin 197 acts on the face 198 of the shift lever 18 and swings the same in the clockwise direction. The fork-shaped part of the shift lever 18 which embraces the pin 19 of the lever 20, rigidly connected to the shaft 21 acts on the lever 20 in the anti-clockwise direction and simultaneously swings the shaft 21 and the control lever 22 in the same direction. The control lever 22 now acts with its stop 23 on the pin 25 riveted on to the bar 26, whereby the pin 27 of the bar 26 and the face 199 of the recess 29 move towards one another and come into contact with one another. The control rod 26 is hereby displaced in the direction of the arrow F and the angle lever 30 (Fig. 7) is rotated in the clockwise direction into the position represented in Fig. 7. Thereby the draw key 32, 33 is now coupled by means of the draw key sleeve 36 (Fig. 5) with the toothed wheel 38 whilst the toothed wheel 35 runs inoperative on the draw key sleeve 36 of the toothed wheel 37. The spur wheel 108 (Figs. 3 and 6) disposed on the shaft 109, now transmits the rotational movement immediately through the toothed wheel 38 (Figs. 5 and 6) to the toothed wheel, 37, and finally to the toothed wheel 115 and the tens carrying shaft 116, while the toothed wheels 110, 111 and 35 rotate idly. The tens carrying shaft 116, Figure 11, is hereby rotated in the opposite direction to the arrow 117 that is to say in the opposite direction to that in which it rotates for addition, so that the revolution counter 128 operates in the substractive sense.

In the rotation of the tens carrying shaft 116, the inclined area 200 of the shift lug 130, Figure 12 acts on the tooth 124 of the star wheel 121 positioned furthest to the right, and rotates the same in the opposite direction to the arrow 123 for a whole division. The toothed wheel 125, Figure 13 in fixed relation with the star wheel 121 is hereby likewise rotated in the reverse direction to that of the arrow 123 and as this is in engagement with the toothed wheel 126 fixed to the numeral wheel 127 of the revolution counter 128, it and therefore the numeral wheel 127 are rotated for a whole unit in the opposite direction to the arrow 129 that is to say in the subtractive sense. The addition lug 119, which stands in the way at the end of the complete rotation of the tens carrying shaft 116 is, through the action of the tooth 124, then assuming the place of the tooth 120 of the star wheel 121 pressed back on the notch 201 of the lug 119 against the action of its spring 202.

A rotation of the star wheel 121 in consequence of the positive guide for this wheel given by the notch 201 and the transport piece 132 cannot take place.

As the tens transfer in the revolution counter under the heading "Addition" was described in detail, a further explanation of the same at this place may be omitted. It should be here mentioned that in substraction the inclined surfaces indicated with the reference numerals 203 to 209 of the transport pieces 143, 210 to 216 act then to effect generally all rotational movements in the reverse directions to that in addition.

The lever 40 (Fig. 15) rigidly mounted on the shaft 21 is likewise acted on in the anti-clockwise direction and displaces the pin 39 in the direction of the arrow F, whereby the pin 39 couples the rack 217, so that the differential actuating mechanism is set for subtraction. Accordingly, the subtraction operation is carried out by addition of the complementary number of the subtrahend in the result register 152 (Fig. 1). Naturally, exactly as in addition, in subtraction also at any time after the setting of the lever 9 on "Add." or "Mult." by depression of the subtraction key 196 either independently of holding the subtraction key depressed only one movement of the differential actuating mechanism of corresponding to the duration of depression of the subtraction key 196 any desired number of movements can be effected.

Carriage shift movement to the right

When the key 218 for shifting the carriage to the right Figure 1 is depressed, the key lever 219 (Figure 22) apertaining thereto swings round the shaft 220 in the clockwise direction, whereby the connecting rod 221 jointed to its arm 222 is carried along with it in the direction of the arrow F. Hereby the angle lever 223 is swung round the shaft 224 in the clockwise direction, against the action of the spring 225 attached to its arm 226. The nose 227 acts then on the projection 228 (Figure 15) of the part 229 rigidly fixed on the clutch control shaft 62 and swings the part 229 as well as the shaft 62 in the opposite direction to the arrow 90. In this swinging movement, the clutch lever 88 rigidly mounted on the shaft 62 also participates, and releases the nose 230 (Figs. 2 and 8) of the carriage shift clutch 231.

In consequence of this, through the action of the spring 232 which acts on the pawl 233, the nose 234 of the pawl 233 is brought into the rotational path of the cam 97 of the main driving shaft 82, so that in the rotation of the main driving shaft 82 the clutch 231 participates in this rotation. The rotation of the main driving shaft 82 is effected by the motor after closing of the contact 78, 79 Figure 15 which proceeds as follows:

In the swinging of the clutch lever 88 against the action of the spring 86 (the lever 65 lies with its face 235 on the machine frame) in the reverse direction to the arrow "90" the lug 236 of the clutch lever 88 (Figure 15) acts on the face 237 of the lever 67 and swings the same as well as the lever 68, connected with it by means of the bridge 69, in the anti-clockwise direction, round the shaft 71 whereby the contact 78, 79 is closed in the same manner as explained under the heading "Addition". Accordingly, the motor 80 drives the shaft 82 through the worm gear 83, 84. As now, as hereinbefore mentioned, the carriage shift clutch 231 Figure 8 is closed, the toothed wheel 238 Figures 2 and 8 rigidly connected to the clutch housing 231 and in engagement with the toothed wheel 239 is placed in rotation in the direction of the arrow 85.

In order to transfer this rotation to the pin disc 240, Figure 10, which shifts the carriage 122 (Fig. 1) the toothed wheel 239 is coupled with the pin disc 240 through a draw key clutch as follows:

On the depression of the key 218 for shifting the carriage to the right, prior to the operation of the arm 227, Figure 22 of angle lever 223 on the part 229, the arm 226 of the lever 223 acts on the arm 241, Figures 23 and 22 of the lever 242, provided that the same is not already situated in the position illustrated in Figure 22, which is always the case when the carriage 122 takes up its extreme left-hand position. Should, however, the carriage 122 be in an intermediate position, the arm 241 of the lever 242 in consequence of the spring 243 connected to the lever 244, would be raised, and in this case then the lever 242 is swung by means of the arm 226 of the lever 223 round the screw 245 in the direction of the arrow 246. In the swinging of the angle lever 223 in the clockwise direction, the same acts further on the arm 247 Figure 23 of the lever 248 swingably mounted round the screw 245 and swings the same likewise in the direction of the arrow 246. The pawl 249 swingably mounted on the part 229 (Fig. 15) then projects into the recess 250 of the part 242 in such a manner that it is situated to the left of the lug 251 of the part 242 and its upper edge 252 lies at the level of the edge 253 of the projection 251 of the lever 242. As above mentioned, the lever 242 is next swung in the direction of the arrow 246. As the edge 252 of the pawl 249 is disposed now directly beneath the edge 253 of the lever 242, the shaft 62 swings under the action of the arm 227 of the lever 223 in the opposite direction to that of the arrow 90, whereby the spring 254 of the pawl 249 is tensioned. As soon as the lever 242 has swung out completely in the direction of the arrow 246, the pawl 249 snaps under the action of its spring 254 at 255 behind the lug 251 of the lever 242 and so prevents a swinging out of the same in the opposite direction to the arrow 246 which otherwise could happen under the action of the spring 243 attached to the angle lever 244.

The arm 241 of the lever 242 acts now in its swinging movement in the direction of the arrow 246 with its lug 256 on the downwardly directed limbs of the cross shaped control lever 257 and swings this likewise in the direction of the arrow 246 round the screw 245. The control lever 257 is acted on by the spring 258 attached on the one side to the lug 259 of the lever 248 and on the other side to the pin 260 of the control lever 257 so that the noses 261 and 262 of the control lever 257 rest against the lower edges of the horizontal arm of the lever 248. The connecting rod 263 jointed to the control lever 257, in the swinging of the control lever 257 in the direction of the arrow 246 is displaced in the opposite direction of the arrow A and swings the lever 264 jointed to it and rotatable round the points 265, 266 in the direction of the arrow 267.

Through the swinging of the lever 264 in the direction of the arrow 267 the draw key 258 (Fig. 10) 269 is displaced in the direction of the arrow F, whereby the draw key sleeve 270 is coupled with the toothed wheel 239. As this now rotates in the direction of the arrow 271 the draw key sleeve 270 and the pin disc 240 fastened to it, are rotated by means of the draw key 268, 269 in the same direction. It may be here remarked that the transmission between the toothed wheels 238 and 239 is so chosen that the toothed wheel 239 in one rotation of the toothed wheel 238 makes only half of one rotation, consequently the pin disc 240 also makes in each rotation of the toothed wheel 238 only half a rotation.

The toothed wheel 272 engaging with the toothed wheel 238 by means of the intermediate wheel 273, Figure 2, rotates idly with them in the opposite direction of the arrow 271 Figure 10. The pins 274 and 275 of the disc 240 engage in the recesses 276 (Fig. 25) of the carriage shift bar 277, whereby the carriage 122 is displaced in the direction of the arrow A towards the right.

The carriage shift movement to the right continues naturally as long as the key 218 for shifting the carriage to the right is held depressed. Precautions must, however, be taken that in the entering of the carriage 122 into its right-hand end position, the carriage shift clutch 233, 97 automatically is opened. This takes place in the following manner:

As mentioned on the depression of the key 218 for shifting the carriage to the right, the lever 248, Figure 23, is swung into the position illustrated in Figure 22. This swings through the fork-pin connection 278, 279, the angle lever 244 into the position represented in Figure 22. It may be here mentioned that in holding the key 218 for shifting the carriage to the right depressed, the arm 226 of the lever 223 also lies on the lever 248 and the arm 280 of the lever 244 is then disposed in the path of the projection 281 of the carriage 122. If the carriage 122 moves in the arrow direction A, while the key 218 for shifting the carriage to the right is held depressed, then in the entering of the carriage 122 into its right position, the angle lever 244 is swung in the direction of the arrow 282 by the projection 281, whereby the lever 248 is swung round the screw 245 in the opposite direction of the arrow 246. Through this swinging movement of the lever 248, the arm 226 of the angle lever 223 is raised, whereby this is swung round the shaft 224 in the anti-clockwise direction. Consequently the rod 221 jointed to angle lever 223 is displaced in the direction of the arrow E, whereby the key lever 219 jointed to the rod 221 is swung round the shaft 220 likewise in the anti-clockwise direction, and the key 218 for shifting the carriage to the right is pressed up again against the pressure exerted by the operator.

As this pressing-up is effected positively, also the rod 263 is displaced in the direction of the arrow A by the control lever 257. Consequently, the bail 264 is swung in the opposite direction to that of the arrow 267 whereby also the draw key 268, 269 Figure 10 is displaced in the direction of the arrow E. As however, at this point the toothed wheels 239, 272 rotating in opposite directions have not again taken up their rest position, without the provision of special means, a jamming action would arise, because the part 268 of the draw key 268, 269 can not yet enter the groove 282 of the toothed wheel 272. For this purpose the connection between the lever 248 and the control lever 257, by means of the spring 258, is of resilient construction. If the lever 248, when the carriage enters into its extreme right position, is swung in the opposite direction to the arrow 246 play arises first of all between the lugs 262 of the control lever 257 and the arm 247 of the lever 248, which play then as soon as the toothed wheels 239, 272 have taken up their rest position, is immediately taken up by the spring 258, which through the parts 263 and 264 displaces the draw key 268, 269, so that the part 268 of the draw key engages with the groove 282 of the toothed wheel 272. In this manner the drive 239, 272 at the end of the carriage right movement, preparatory to the movement of the carriage to the left is reversed. Through the swinging of the angle lever 223 in the anti-clockwise direction, the nose 227 of the same, releases the projection 228 of the part 229, rigidly mounted on the shaft 62, whereby under the action of the spring 86, the shaft 62 and the clutch lever 88 are swung in the direction of the arrow "90" and thus the face 283 (Fig. 9) of the clutch lever 88 again enters into the path of the nose 230 of the clutch pawl 233 whereby the carriage shift clutch 233, 97 is opened and the carriage comes to a standstill.

In the swinging of the clutch lever 88 in the direction of the arrow 90, the bail 67, 69, 68 Figure 15 under the action of its spring 70 is swung in the same direction, whereby the contact lever 72 jointed to the lever 68, is displaced in the direction of the arrow E. The arm 73 of the contact lever 72, by means of the curve 194, then runs up again on the conical periphery 75 of the cam 76 whereby the contact spring 77 through the contact lever 72, is pressed together and the contact 78, 79 is opened and therefore the motor 80 is brought to a standstill.

If the key 218 for shifting the carriage to the right is struck and immediately again released, the levers 248, 244 in consequence of the above mentioned lock 249, 251 remain in their broken through position represented in Figure 22, whilst the remaining movements proceed as above described. Consequently then only one rotation of the carriage shift clutch 233, 97 is released and accordingly the pin disc 240 only makes one half of a revolution, whereby the carriage 122 is engaged in the next decimal position to the right. If one desires to displace the carriage 122, through a number of decimal positions to the right, the key 218 for shifting the carriage to the right must be held depressed until the carriage assumes its desired position.

*Carriage shift movement to the left*

On depression of the key 284 (Fig. 1) for shifting the carriage to the left, the appertaining key lever 285 (Fig. 22) is swung round the shaft 220 in the clockwise direction, whereby the connecting rod 286 jointed to the key lever 285 is carried along in the direction of the arrow F. Thereby the angle lever 287 is swung in the clockwise direction against the action of the spring 288 connected to its arm 289 and acts with its nose 290 on the projection 291 of the part 229. As a result, through the mechanism 62 and 88 already described in the shifting of the carriage to the right, the carriage shift clutch 231 is closed whereby the toothed wheel 238 fixed to the coupling 231 rotates in the arrow direction "85" and the toothed wheel 239 engaging with the wheel 238 rotates in the direction of the arrow 271.

As the lever system 248, 242 and 257 in consequence of the action of the spring 243 on the angle lever 244, excepting in the extreme left hand position of the carriage is always so set that the levers 248 and 244 are broken upwardly, the arm 289 of the lever 287 never operates as a driving member on the lever 248 but serves only as a locking arm in the case in which the key 284 for shifting the carriage to the right is depressed. The rod 263 appears also in all cases, except in the extreme left hand position of the carriage, displaced in the direction of the arrow A, whereby through the fork-shaped end of the lever 264, which engages in the ring groove 292 of the draw key 269, 268, the latter is so far displaced in the direction of the arrow E that the part 263 engages the groove 282 of the toothed wheel 272, clutching the same with the draw key sleeve 270 and consequently with the pin disc 240, whereby the gear for the carriage shifting device is always set for shifting the carriage to the left.

Consequently the toothed wheel 238, which besides being in engagement with the toothed wheel 239, is also in engagement with the intermediate wheel 273 (Fig. 2) rotates the toothed wheel 272 and consequently the draw key sleeve 270 clutched with it, and the disc 240 in the reverse direction to that of the arrow 271, whereby by means of the pins 274 and 275 the carriage 122 is displaced to the left. Besides, the toothed wheel 239 is rotated idly in the direction of the arrow 271.

The pawl 249 Figure 15 rests naturally against the side 293 of the lug 251 of the lever 242 and locks the latter in its position. This is, however, only a secondary consideration, as will be evident from the above description of the carriage right shift movement. This locking is here not necessary, as the spring 243 engaging the angle lever 244 also opposes a swinging movement of the lever 248 in the direction of the arrow 246. If the carriage 122 runs now into its extreme left hand position, the carriage projection 294 acts on arm 280 of the angle lever 244 and swings it and the lever 248 into the position illustrated in Figure 22. As a result, the arm 295 of the lever 248 raises the arm 289 of the angle lever 287, and swings it in the anti-clockwise direction, whereby through the rod 286, jointed to it, the key 284 for shifting the carriage to the left, is raised. Hereby again, as is described in connection with the key 218 for shifting the carriage to the right, play arises between the end 295 of the lever 248 and the lug 261 of the control lever 257 which play after the toothed wheels 269 and 272 have again taken up their rest positions, is taken up by the spring 258 which through the parts 263 and 264 displaces the draw key 269, 268 Figure 10, so far in the direction of the arrow F, that its part 268 clutches the toothed wheel 239 with the draw key sleeve 270, whereby also automatically the gear 239, 272 is reversed for carriage right shift movement.

The opening of the carriage shift clutch 231 and of the contact 78, 79 follows exactly as is described in connection with the key 218 for shifting the carriage to the right.

*Clearing mechanism for the accumulator*

On depression of the clearing key 296 (Fig. 24) for the accumulator 152, the key lever 297 is swung round the shaft 298 in the clockwise direction against the action of the spring 299 engaging with the lever 300 which by means of the bridge 301 is in connection with the key lever 297. The connecting rod 302 jointed to the downwardly projecting limb of arm 297 is thereby displaced in the direction of the arrow F. As a result, the lever 303 jointed to it, swings round the point 304, in the clockwise direction, whereby the arm 305 of the lever 303 with its part 306 acts upwards against the arm 307 of the clutch lever 308 and in consequence of this swings it round the screw 309 in the clockwise direction. Accordingly, the nose 310 of the arm 311 releases the nose 312 (Figures 24 and 8) of the pawl 313 of the clearing clutch 314. Thereby the clutch pawl 313 under the action of its spring 315 is brought with its nose 316 into engagement with the tooth 317 of the clutch cam 318, fastened on the driving shaft 62 whereby the cam 318, the pawl 313 and consequently also the clutch housing 314, in which the pawl 313 is mounted by means of the pin 319 are carried along in the direction of the arrow 85.

The arm 320 (Figure 24) of the lever 303 acts in its swinging movement in the clockwise direction, on the lever 321 and swings the same round its axis 322 likewise in the clockwise direction. Consequently, the arm 323 of the same acts upwards against the U-shaped end 324 of the lever 325 and swings the same round the screw 326 against the action of the spring 327 in the anti-clockwise direction. Besides, the U-formed end 324 of the lever 325 engages the opposite lying groove 328 (Figure 25) of the clearing bar 329. In the swinging of the lever 303 Figure 24 the face 330 acts on the roller 66 provided on the lever 67 and closes, by means of the parts 69, 68, 72, as already described in detail, the motor contact 78, 79, whereby now the motor 80 commences to run in the direction of the arrow 81.

As now the motor contact 78, 79 and the clearing clutch 314 are closed, the clutch 314 rotates in the direction of the arrow 85, whereby the pin 331 fixed to the clutch disc 332 through the parts 333, 334, 335, 336 moves the lever 325 backwards and forwards, whereby the lug 337 slides on the face 338 of the part 339 while the lever 340 jointed to the lever 336 by means of the screw 341 slides with its U-formed part 342 on the face 343 of the part 344, without influencing any part.

As already described, the lever 325 moves backwards and forwards, and is held, for the time being in positive engagement with the groove 328 (Figure 25) of the clearing bar 329 in consequence of which the latter also moves backwards and forwards, and at the commencement always in the direction of the arrow A. As a result, the clearing wheels 345 (Figure 25) are rotated in the anti-clockwise direction, according to which the toothed wheels 346 rotate in the direction of the arrow 172 and consequently, the co-operating numeral wheels 151 (Fig. 21) move to zero.

If the clearing key 296 is held longer in the depressed position, no damage is done, as here the clearing wheels 345 are only idly moved backwards and forwards by the rack 347 of the clearing bar 329 as they, in consequence of the toothed spaces 348, Figure 25, once lying opposite to them, are unable to influencing the toothed wheels 346.

In the swinging of the lever 303 in the clockwise direction, the nose 349 of the lever 303, acts on the angle lever 350 and swings the same round its axis 351 against the action of the spring 352 in the clockwise direction. If the nose 349 has released the lever 350, the same snaps under the action of its spring 352, behind the nose 349 of the lever 303 and holds the same consequently in its swung out position.

Approximately after one half revolution of the clearing clutch 314, the pin 353 of the clutch 314 acts on the arm 354 of the lever 350 and swings the same in the clockwise direction against the action of the spring 352. The lever 350 then releases the nose 349 of the lever 303, whereby the same under the action of the spring 299, engaging the arm 300 of the key lever 297 returns as well as the remaining mechanism to their rest position.

This arrangement has for its purpose, in the case of too short strokes of the key 296, to hold the lever 303, so long outswung until the lever 325 with its lug 337, has run up on the bar 338.

*Clearing mechanism for the revolution counter U*

On the depression of the clearing key 355 for the revolution counter 128, the key lever 356, Figure 24 is swung round the shaft 298 against a spring not shown, engaging with bridge 357 in the clockwise direction. As a result, the connecting rod 358, jointed to its downwardly projecting limb 359 moves in the direction of the arrow F. Consequently, the lever 360 jointed to it, swings round the point 361 in the clockwise direction, whereby the arm 362 of the lever 360 acts with its part 363 upwards against the arm 307 of the clutch lever 308, owing to which the latter is swung round the screw 309 in the clockwise direction, against the action of the spring 364. Accordingly, the nose 310 of the arm 311 of the clutch lever 308, releases the nose 312 of the pawl 313 of the clearing clutch 314, whereby in the manner already described, the clutch 314 is closed.

The arm 365 of the lever 360 acts, while swinging in the clockwise direction, on the arm 366 of the lever 367 and swings the latter round the screw 368 in the clockwise direction. The spring 369, engaging with the arm 370 of the lever 367 swings therefore the lever 371 likewise in the clockwise direction round the screw 368. Consequently, the right angled bent end 372 of the lever 371 acts upwards against lever 340, swingable on the lever 336 by means of the screw 341 and swings the same against the action of the spring 373 in the anti-clockwise direction. As a result, the U-formed part 342 of the lever 340 engages the opposite lying groove 374 (Fig. 25) of the clearing bar 375.

In the swinging movement of the lever 360 Fig. 24 in the clockwise direction, the face 376 acts on the roller 66 arranged on the lever 67, whereby over the already previously mentioned parts 69, 68, 72, the motor contact 78, 79 is closed and the motor commences to run in the direction of the arrow 81.

As now the motor contact 78, 79 and the clearing clutch 314 are closed the clutch 314 rotates in the direction of the arrow 85 whereby the pin 331 fastened to the clutch disc 332 through the parts 333, 334, 335, 336 moves the lever 340 backwards and forwards, whereby the lug 377 slides on the face 343 of the part 344 while the lever 325 jointed to the lever 336 by means of the screw 326 slides with its U-formed part 324 on the face 338 of the part 339 without influencing any part.

As already described, the lever 340 moves backwards and forwards and is positively held for the time being in engagement with the groove 374 of the cancelling bar 375. Consequently also, the latter is moved backwards and forwards, and at the commencement in the direction of the arrow A. As a result, the clearing wheels 378 Figure 25 are rotated and carry along with them all the toothed wheels 379 not at zero, until the toothed space 380 of the same lies opposite the wheels 378. As the wheels 379 by means of the sleeve 381 (Figure 28) are rigidly connected with the wheels 125 and as the latter are in engagement with the wheels 126, the wheels 126 (Fig. 28) and the numeral wheels 127 rigidly connected with them are rotated to zero.

Holding of the clearing key 355 depressed for a longer time does no damage, as hereby the clearing wheels 378 are only moved backwards and forwards idly by the rack 375 as they, in consequence of the tooth spaces 380, lying opposite to them, Figure 25, are no longer able to influence the toothed wheels 379.

In the swinging movement of the lever 360 Figure 24 in the clockwise direction, the angle lever 350 is able to snap behind the nose 382 of the lever 360 and to hold the same in its outswung position. After approximately half a rotation of the clearing clutch 314, the pin 353 of the clutch 314 acts on the arm 354 of the lever 350 and swings the same against the action of its spring 352 whereby it releases the nose 382 of the lever 360, so that the lever 360 is returned to its rest position under the action of the spring 364 engaging with the lever 308.

After this brief description of the known mechanisms of the machine, the invention proper will now be described in detail.

On each numeral wheel shaft 150 (Figs. 21, 26 and 31) a toothed wheel 149, a numeral wheel 151, a setting wheel 383, a tens transfer wheel 184, a clearing wheel 346 a toothed wheel 384 and an adjusting knob 385 are fastened.

On the rear side of the machine, an amount storing means 386 is rotatably mounted by means of pins 387 in blocks 388 (Fig. 26) attached to a plate 389 (Figs. 26 and 28) rigidly fixed to the machine housing. The amount storing means 386 carries between two bars 390 and 391 (Figs. 26 and 29) a wheel 392 for each accumulator shaft 150. Normally the wheels 392 are out of engagement with toothed wheels 384 fixed on the accumulator shafts 150 and as represented in Fig. 28 are secured against rotational displacement by a comb 393, the teeth of which engage in the spaces between the teeth of the wheels 392.

In order to hold the wheels 392 between the two bars 390 and 391 in their position for the time being, when they engage neither with the comb 393, nor with the toothed wheels 384 in the wheels 392, stops 394, (Figs. 29) are provided, into which balls 395 are capable of entering, the balls being mounted in holes 396 of the bar 391. The balls 395 are pressed towards the stops 394, of the wheels 392 by spring blades 397 which are fixed to the bar 391 by means of the screws 398. The screws 398 at the same time connect the bars 390 and 391 with one another. Each wheel 392 (Fig. 29) is provided with a projection 399, which rests against a pin 400 of the bar 390 whereby the zero position of the wheels 392 is determined or over-running of the zero position is avoided.

In order that the amount storing means 386 may be rotationally displaced by hand from its position as represented in Fig. 28, into its position as represented in Fig. 30, the following device is provided.

To the left of the right-hand side of the machine, and adjacent to the clearing keys 401, 296, 355 a total key 402 is arranged, having the letter S, thereon the key lever 403 of which (Figs. 32 and 33) is mounted so as to be capable of oscillation around the shaft 298 (Figs. 24 and 32). On the end remote from the key 402, the key lever is provided with a fork 404 in which engages a crank arm 405 of a shaft 406 (Fig. 23) mounted in bearings in the front of the machine. On the left hand end of the shaft 406 (Fig. 37) an arm 407 is fixed to which arm a rod 408 is jointed, which latter with its cut-out portion 409, engages over a pin 410 of a three-armed lever 411 which is rotatably mounted at the point 412 in the machine housing. The lever 411 carries rotatably on its upwardly directed arm a roller 413, which is adapted to co-act with a cam 414, fixed on the shaft, 109, the cam in the rest position of the machine occupying the position represented in Fig. 37 in relation to the roller 413 of the lever 411. The rearwardly projecting arm of the lever 411 is provided with a toothed segment 415 which is in engagement with a toothed wheel 416 rotatably mounted on the machine housing by means of a pin 417 and which is so dimensioned that on the depression of the total key 402, it rotates the toothed wheel 416 through 180° in the clockwise direction. With the toothed wheel 416, a lever 418 is in fixed connection carrying the pin 419 to which a rod 420 is jointed, the rod at its upper end being in pivoted connection with a pin 421 (Figs. 37 and 26) of the lever 422 fixed on the left hand pivot pin 387 of the amount storing means 386. By means of a spring 423 connected at one of its ends to a pin 424 (Fig. 37) on the machine housing and at its other end to a pin 425 of the bar 408, the combination of rods described up to the present is held in its rest position represented in Figs. 28, 32, 33 and 37, which is determined by the striking of the lever 411 against a pin 426, arranged on the machine housing.

In order to clear the wheels 392, so far as a value is present in them, the following device is controlled by the total key 402.

Further, on the pivot pin 417 (Fig. 37) arranged on the machine housing for the toothed wheel 416, a three-armed lever 427 (Fig. 38) is pivotably mounted. The inclined edge 428 of the upwardly projecting arm of the lever 427 co-acts with a roller 429 rotatably mounted on the toothed segment arm of the lever 411, and is held in contact therewith by a spring 430 which engages with the arm 431 of the lever 427, whereby the pull of the spring 430 likewise is taken up by the stop pin 426 for the lever 411. In the hole 432 of the arm 433 of the lever 427 engages a pin shaped projection 434 of an angle lever 435 rotatably mounted at 436. The angle lever 435 (Figs. 37 and 39) has an upwardly projecting arm 437, which is constructed of fork-shape. With this fork it embraces a disc 438 slidably but non-rotatably arranged on the shaft 109 by means of a key 439, the disc 438 being provided with a pin 440, which is capable of projecting into a corresponding hole or the right hand side disc of the pin wheel 153, which latter according to the invention instead of being rigidly mounted on shaft 109 as shown in Fig. 39, is rotatably but non-slidably mounted thereon.

If the angle lever 435 is in the rest position represented in (Figs. 37 and 39), the driver disc 438 with the sleeve 441 of a cam 442 arranged on the shaft 109 is displaced to the left, that is to say in this case the pin wheel 153 is coupled with the shaft 109 and the cam 442, lies laterally of a roller 443 to be hereinafter described in detail, so that the roller is not acted on by the cam. If however, the angle lever 435 is swung in the clockwise direction by the lever 427, the pin 440 of the driver disc 438, comes out of engagement with the pin wheel 153, while the cam 442 is slid into the path of the roller 443. In this case, in order to prevent a rotational movement of the pin wheel 153, an arm 444 arranged on the angle lever 435 enters a groove 445 of the left-hand disc of the pin wheel 153. The object of the connection 153, 440, 438, 109 is the following. If by depression of a value key (Fig. 21) of the keyboard, a value has been entered in the differential actuating mechanism 7, it is necessary to transfer such value to the numeral wheels 151 of the accumulator 152. Since the racks of said differential actuating mechanism 7, in each cycle of operation of the machine move once to and fro, the differential actuating mechanism must be coupled with the numeral wheels 152 only during the movement of the differential actuating mechanism 7 in one direction, whereas in the other direction, they must be uncoupled from the differential actuating mechanism, for were it not so, the value would be transferred to the numeral wheels 151 and immediately thereafter it would be withdrawn from the numeral wheels 151 and no value would have been registered. In the Mercedes Euklid calculating machine, as has been mentioned, this coupling device consists of a coupling wheels frame 161 (Fig. 21) arranged between the gears 148 of the differential actuating mechanism and the gears 149 of the numeral wheel shafts 150 for the accumulator 152. In order to control the coupling movement of the coupling wheels frame 161 as pointed out above, a gear 159 (Figs. 3 and 21) is fixed on the trunnion of the wheels frame 161, which gear 159, by means of the gears 160 (Fig. 4), 158, maltese cross 154, is in driving connection with the pins 155 (Figs. 4 and 39) of the pin wheel 153, which receives its driving movement by means of the parts 440, 438, 439 from the shaft 109 of the accumulator 152. The pin wheel 153 consists in the main, of two discs 446, 447 pins 155 (Figs. 4 and 39) and a locking piece 156. The pin wheel 153 and the maltese cross 154 are arranged in such a manner that the transference of the value from the gears 148 to the gears 149 takes place by means of the wheels frame 161 during the movement of the differential actuating mechanism in one direction or during the first half revolution of the shaft 109, whereas the uncoupling between said gears 148 and 149 takes place at the beginning of the return movement of the differential actuating mechanism or at the beginning of the second half revolution of the shaft 109. It will be recalled to mind that the shaft 109 makes one revolution for each cycle of operation of the machine. During the second half of its revolution, the eccentrics 181 of the shaft 109 act on the tens shift slides 180 (Figs. 20, 21, 28) for the accumulator 152.

As has been mentioned, in the ordinary Mercedes Euklid calculator, the pin wheel 153 is fixed directly on the shaft 109, but in the present case, as will be seen later, this wheel must be selectively uncoupled from the shaft 109 in each transference from the amount storing means 386 to the accumulator 152, because in this case the rotation of the shaft 109 is used to actuate the clearing means for the amount storing means 386 and as the shaft 109 may only be rotated, when said differential actuating mechanism is operated, values could be transferred from the differential actuating mechanism to the accumulator 152 during the transference of values from the amount storing means 386 to the accumulator 152 which would result in damage of the machine. If however in transferences from the amount storing means 386 to the accumulator 152 the connection 440, 153 (Figs. 37 and 39) is released, the pin wheel 153 remains at rest on the rotation of the shaft 109 and consequently the coupling wheels frame 161 (Fig. 21) also remains in its rest position represented in Fig. 28, in which even if the shaft 147 is driven from the differential actuating mechanism 7, no transference to the numeral wheels 151 results.

With the driver disc 438 (Fig. 39) the cam 442 is rigidly connected by means of a sleeve 441, the cam being capable of co-acting with a roller 443 which is rotatably mounted on a lever 448 attached to a rotatably mounted shaft 449. At the other end of the shaft 449 a lever 450 is fixed, of which the pin 451, lies adjacent to the free end 452 of the rod 408. The free end of the lever 450 again lies below a horizontal limb of an angle lever 453 which is rotatably mounted at 454 on the machine housing. The vertical arm of this angle lever is jointed by means of a screw 455 to a horizontal rod 456 slidably mounted at 457 on a fixed shaft 458. Rod 456 engages by means of the bent portion 459 in a corresponding recess 460 of a slidably mounted rack 461 (Figs. 26, 28, 31 and 37) which is held by means of a spring 462 in its rest position represented in Fig. 37 opposite to the direction of the arrow A indicated in Fig. 37 against a projection (not shown). This rack 461 is in engagement with clearing wheels 463 (Figs. 26, 27, 28, 31 and 37) which have a so-called zero space 464 (Fig. 27) which is attained by cutting away a tooth for over half of its breadth. The zero spaces 464 lie in the rest position of the rack 461 opposite to the wheels 392 so that these, if they are driven by the wheels 384, are able to rotate freely. The wheels 392 are likewise provided with a zero space 465 (Fig. 30) so that they, insofar as they are already at zero, cannot be influenced by the rotating clearing wheels 463.

The positions of the zero spaces 464 and 465 laterally in relation to one another is represented in Fig. 31. In other words, the zero spaces 464 and 465 co-operate in the same manner as the zero spaces 466 and 348 of the clearing device 347, 345 and 346 for the numeral wheels 151 of the accumulator 152 (Fig. 26).

As in the amount storing means 386 on each occasion only one value may be stored, as distinguished from devices in which several values may be totalled, precaution must be taken that a transference from the accumulator 152 to the amount storing means 386 only takes place when the storing means is at zero and a transference from the storing means into the accumulator only takes place when one value is contained in the amount storing means 386. This alternative control is effected by the following parts:

On the downwardly projecting limb 467 (Figs. 32 and 33) of the key lever 403, a rod 468 is jointed by means of a pin 469, which rod is pivotally connected by means of a screw 470 to a link 471, swingable on a pin, 472, on the right hand machine wall 473, in such a manner that on the depression of the total key 402, said rod 468 executes a horizontal sliding movement. Between the rod 468 and the head of the screw 470 are further arranged two oscillating retaining hooks 474 and 475. The retaining hook 474 is acted upon in the anti-clockwise direction by a spring 476, which is connected at 477 to the machine housing and to a pin 478 of the retaining hook 474, whereby its rest position is determined by the nose 479 of its upright arm 480 striking against a nose 481 of a shift lever 482. This lever 482 is pivotally mounted by means of a screw 483 to the right hand wall 473 of the machine and by means of a compression spring 484 interposed between it and the head of the screw 483, it is held in the position given to it on each occasion. On its upper end, the shift lever 482 is provided with a portion 485 bent to the left (seen in Fig. 32) which lies in the path of movement of a rod 333 actuated by the clearing clutch 314. The bent portion 485 is preferably as shown in dotted lines in Fig. 33, extended so far upwards that it projects above the cover plate 486 of the machine and in the manner hereinafter described serves as an indicating device for the amount storing means 386, that is to say it indicates to the operator whether values are contained in the amount storing means 386 (mark S) or not (mark L). On the lower arm the lever 482 is provided with a lug 487 which lies in the path of movement of an arm of a lever to be hereinafter described. At its forward end the retaining hook 474 is provided with a recess 488, which is capable of embracing an arm 489 arranged on the beforementioned connecting rod 302 of the clearing key 296 for the accumulator. With its rearward downwardly directed nose 490, the retaining hook 474 lies in front of a lug 491 of the retaining hook 475 and is maintained in contact with lug 491 by a spring 492 which at one end is connected to the pin 493 on the upwardly projecting arm of the retaining hook 475 and at the other end to a pin 494 on the retaining hook 474. On an upwardly projecting lug 495 of the rod 468, a pin 496 is disposed which, as hereinafter described, limits the turning of the arm 497 of the engaging hook 475.

On the left hand end (as viewed in Fig. 32) of the retaining hook 475, a second lug 498 is arranged on the retaining hook which lug is capable of co-acting with a lift surface 499 to be hereinafter described, on the machine housing.

Further, on the left hand end of the retaining hook 475 a recess 500 is formed which is capable of engaging over a lug 501 of an angle lever 502 (Figs. 32 and 34). By means of a screw 503 (Fig. 34) the lever 502 together with an angle lever 504 are pivotably mounted at the point 505 of the lever 506. The lever 506 is pivoted on the machine housing by means of a screw 507 so that when the lever 506 executes a swinging movement, the angle levers 502 and 504 on it are also swung inasmuch as no separate forces act on them. Into a slot 508 of the lever 502, a pin 509 fixed to the lever 506 projects whereby the lever 502 is capable of executing a limited movement relative to the lever 506. By means of a spring 510 attached on one hand to the machine housing at 511 and on the other hand to the pin 512 of the lever 502, the right hand end (as viewed in Fig. 34) of the slot 508 of the lever 502 is drawn against the pin 509 of the lever 506. Consequently the levers 502 and 506 co-operate, so that the lever 506 is also acted on by the spring 510 round the screw 507 in the clockwise direction whereby the rest position of the lever 506 is determined by the striking of its edge 513 against a projection 514 (Figs. 32 and 33) fixed to the machine housing.

By means of a spring 515 attached to a pin 516 (Fig. 34) of the lever 506 and a bent off lug 517 of the lever 504, the lever 504 is acted upon in the anti-clockwise direction, whereby its rest position is determined by its lug 517 striking on the lever 502. The upwardly directed end 518 of the lever 502 lies in the path of movement of a strip 439 (Figs. 32, 33, 35 and 36) arranged on the right hand end of the shaft 109 and the arm 519 of the lever 502 is capable of acting on the above-mentioned lug 487 of the shift lever 482 in such a manner that the lever 482 is rocked anti-clockwise from the position shown in Fig. 33 to that shown in Fig. 32 which action will be described more in detail later on. The lever 506 further has noses 520 and 521 and a slot 522 which coacts with a pin 523 (Figs. 32 and 33) riveted into a lever 524, fixed on a shaft 62, on which shaft also the coupling lever 88 is fixed for controlling the carriage shift clutch 231 and the clutch 92 for the differential actuating mechanism.

The pin 523 in its normal position is located in front of the slot 522 as shown in Fig. 33. Accordingly, the lever 506 may be rocked freely round the screw 507 in the anti-clockwise direction. If however, the coupling lever 88 is rocked in the clockwise direction Fig. 33 to close the carriage shift clutch 231, whereby the parts 62 and 524 are also rocked in the same direction, the pin 523 comes to lie in front of the nose 521 and prevents the lever 506 from swinging in the anti-clockwise direction. Similarly such a swinging movement of the lever 506 is prevented when the pawl 91 of the coupling 92 for the differential actuating mechanism 7 is freed by a swinging movement of the clutch lever 88 in the anti-clockwise direction, to close the clutch 92, in which case the pin 523 lies in front of the right-hand edge of the nose 520 of the lever 506.

In order to prevent the operation of the revolution counter 128 when depressing the total key 402, the following arrangement is provided. On the downwardly projecting extension 467 (Figs. 32 and 33) of the lever 403 an inverted V-shaped projection 525 is arranged which latter in connection with a nose 526 on said lever 403 forms an open slot and a recess 650, which is engaged by a pin 527 of a lever 528, fixed on the shaft 56. If the total key 402 is depressed, the roof-shaped part 525 (Fig. 32) of the lever 403 acts on the pin 527 of lever 528. As lever 528 and lever 529 (Figs. 32, 21 and 17) are fastened on the shaft 56, the parts 528, 56, 529 are rocked as a whole in the anti-clockwise direction (as viewed in Fig. 32) according to which, by means of the pin and slot connection 530, 531, the right hand part (viewed in Fig. 32) of the lever 26 is displaced downwardly to the position shown in Fig. 17. While moving downwardly, the edge 532 co-operates with the shaft 21, whereby the bar 26 is displaced in the opposite direction of the arrow E (Fig. 7) thereby rocking the angle lever 30 in the clockwise direction, which in its turn, positions the draw-key 32, 33 to its middle position, shown in Fig. 5, in which position neither the wheel 38 nor the wheel 35 are coupled with the sleeve 36. Accordingly, no movement may be transmitted through wheels 37 (Fig. 6) and 115 to the driving and tens carrying shaft 116 of the revolution counter, in other words, on depression of the total key 402, the revolution counter is automatically rendered inoperative through the intermediary of the connections described.

The method of operation of the mechanism is as follows:—

As an example of calculation, let it be assumed that the individual products of the factors 11 × 11, 12 × 16 and 13 × 15, and the total thereof is to be computed and the product of 25 × 5 is to be deducted therefrom.

At the commencement of every calculation, the revolution counter 128 and the accumulator 152 are at zero, only the numeral wheels 533 (Figs. 28 and 40) of the complement totalizer 534, to be later described in detail, stand at "9", and the units numeral wheel thereof 535 (Fig. 40) likewise stands at zero.

After the number "11" is set up in the two right hand rows of keys of the keyboard 1 and the register carriage 122 has been moved one place to the right, inasmuch as multiplying is effected by accumulated addition, the addition key 8 (Fig. 15) is briefly depressed after having set the lever 9 (Fig. 1) to the mark "Mult." The shaft 144 of the machine thereby makes one revolution and the value "11" set up in the two right hand rows of keys is shown on the second and third numeral wheels 151 from the right of the accumulator 152 through the parts 147 (Fig. 21), 148, 162, 149 and 150.

After the carriage 122 has been brought one place to the left, therefore again into its fundamental position the addition key 8 is once more briefly depressed whereby the value "11" now in the first and second place from the right is introduced through the above-mentioned parts into the accumulator 152 and as in the second place of the same a "1" already stands, the "1" of the tens denomination is thus added to the "11" introduced for the second time and in the accumulator 152 appears therefore the product of 11 ×11, namely 121, while the revolution counter 128 shows the multiplier "11".

In order now to bring the value "121" into the amount storing means 386 (Figs. 26, 28 and 37) it is only necessary to depress the total key 402. On the depression of the total key 402 the following operations take place.

The key lever 403 (Fig. 32) is swung in the anti-clockwise direction. Herewith the pin 527 of the lever 528 disposed in the recess 650 of the key lever 403 moves between the two noses 525 and 526, whereby the shaft 56 is likewise rotated in the anti-clockwise direction, so that the revolution counter 128 as above described is rendered inoperative.

Further the shaft 406, the crank arm 405 of which lies in the fork 404 of the key lever 403, is swung in the clockwise direction, and with it the lever 407 (Fig. 37). The rod 408 jointed to the lever 407 is displaced in the direction of the arrow F whereby through the recess 409 engaging with the pin 410 of the three-armed lever 411, the lever 411 is swung in the anti-clockwise direction, consequently the toothed segment 415 of the same rotates the toothed wheel 416 and the crank arm 418 fixed to it in the clockwise direction. Consequently, the rod 420 is drawn downwards and swings the arm 422 fixed to the amount storing means 386 and therewith the amount storing means 386 itself in the clockwise direction, so that the amount storing means 386 is swung from the position represented in Fig. 28 into the position represented in Fig. 31, in which the wheels 392 are in engagement with the toothed wheels 384 fixed on the numeral wheel shaft 150, so that when the numeral wheels 151 and therefore the numeral wheel shafts 150 are now returned to zero, a transference of the value "121" from the accumulator 152 to the amount storing means 386 takes place.

Before this transference operation is described, the following will briefly be alluded to:

On the swinging movement of the three-armed lever 411 (Fig. 37) in the anti-clockwise direction, the roller 429 located on the same has acted on the inclined face 428 of the lever 427 and has swung this lever in the anti-clockwise direction whereby the horizontal arm 433 of the lever 427, by means of the pin 434 connected to the angle lever 435 swings this angle lever in the clockwise direction (Fig. 39). Consequently, by means of the upwardly projecting fork arm 437 of the lever 435 the element consisting of the parts 438, 440 to 442 on the tens shift shaft 109, is displaced in the direction of the arrow A whereby the driven pin 440 of the element 438, 440 to 442 releases the pin-wheel 153, and the arm 444 of the angle lever 435 secures the same against rotational displacement. This movement of the parts 427, 435 and 437, 438, 440 to 442 is in the present case without importance as on the transference of a value from the accumulator 152 into the amount storing means 386, a rotation of the shaft 109 on which the element 438, 440 to 442 is arranged in any case does not take place.

This movement of the parts 427, 435 and 437, 438, 440 to 442 is much more important in the transference from the amount storing means 386 to the accumulator 152 which will be hereinafter described.

After the wheels 392 therefore are in engagement in this manner with the wheels 384 fixed on the numeral wheel shafts 150 according to Fig. 31, the actual transference of the value "121" from the accumulator 152 to the amount storing means 386 will be hereinafter described in detail.

On the swinging of the key lever 403 in the anti-clockwise direction resulting from the depression of the total key 402 (Fig. 32) the rod 468 is drawn forward in the direction of the arrow F. The lug 498 of the retaining hook 475 then runs up on the incline 536 of the fixed projection 499. Consequently the retaining hook 475 is swung round the screw 470 in the clockwise direction against the action of the spring 476 and as the nose 490 of the retaining hook 474 which is also swingable around the screw 470 rests on the lug 491 of the retaining hook 475, the retaining hook 474 is also swung in the clockwise direction. The incline 536 of the projection 499 is so dimensioned that the two retaining hooks 475 and 474 are so far swung in the clockwise direction in Fig. 32 that the recess 480 of the retaining hook 474 embraces the arm 489 of the rod 302 after a short movement of the rod 468 in the direction of the arrow F, whereby naturally between the nose 479 of the retaining hook 474, and the nose 481 of the shift member 482, a corresponding amount of play has taken place. On the further forward movement of the rod 468 in the direction of the arrow F, the lug 498 of the retaining hook 475 runs along the straight upper face of the projecting 499 whereby the engagement of the recess 488 of the retaining hook 474 with the arm 489 is secured positively as long as the total key 402 is held depressed, that is to say the lug 491 of the retaining hook 475 does not leave the upper face of the projection 499 towards the right. During the passage of the lug 498 along the straight upper face of the projection 499 the rod 302 is consequently taken along with it in the direction of the arrow F.

As has been mentioned under the heading "Clearing mechanism for the accumulator", the displacement of the rod 302 in the direction of the arrow F (Figures 24 and 32) rocks the lever 303, as viewed in Figure 24, in the clockwise direction, whereby on the one hand, the motor contact 78, 79 and the clearing clutch 314 are closed which latter operates the rod 333 whereas on the other hand, the part 324 (Fig. 24) of the lever 325 engages with the adjacent recess 328 (Figures 25 and 26) of the clearing rack 329, 347 so that the latter is moved by the part 324 through the parts 334, 335 and 336 interconnected with the rod 333, in the direction of the arrow A indicated in Figs. 26 and 25.

Consequently all the clearing toothed wheels 345 (Fig. 26) are rotated in the anti-clockwise direction while the wheels 346 of the numeral wheel shafts 150 which are not at zero along with the numeral wheels 151 are rotated so far in the clockwise direction that the zero spaces 348 of the wheels 346 lie opposite to the clearing wheels 345 whereby the numeral wheels 151 are set back to zero, thus clearing the accumulator.

As however, the wheels 384 fixed on the numeral wheel shafts 150, as above mentioned, are in engagement with the wheels 392 so the value "121" contained in the accumulator 152 is brought into the three right-hand wheels 392 in the anti-clockwise direction.

This bringing-in operation is then naturally effected temporarily to begin with when the engagement of the wheels 392 with the toothed wheels 384 is secured by the parts represented in Fig. 37.

As the lever 303 was swung in the anti-clockwise direction in Fig. 32 and the nose 236 of the clutch lever 88 has therefore entered into the recess 537, a swinging movement of the clutch lever 88 which could be brought about by unintentional depression of any one of the carriage shift keys 218, 284 or the addition key 8 is impossible. As a result also the closing of the carriage shift clutch 231 or the differential actuating mechanism clutch 92 is impossible. Consequently no rotation of the wheel 100 connected with the differential actuating mechanism clutch 92 (Fig. 32) takes place, so that this wheel cannot effect any rotation through the wheels 103 (Fig. 37), 105 and 106 for which reason, as mentioned above, in this case the cam 442 cannot be operative on the parts 443, 448, 449, 450, 453, 456, 461, 463 acting to clear the wheels 392.

During the movement of the rod 333 (Fig. 32) it has moved upwards against the arm 485 and has thereby swung the shift lever 482 from the position according to Fig. 32 into the position according to Fig. 33, whereby the same points to the mark S and thus indicates that a value is contained in the amount storing means 386.

When the total key 402 is released, the rod 468 (Fig. 32) moves in the direction of the arrow E under the action of the springs 476 and 423 (Figs. 32 and 37), back into its rest position and with it the rod 302 whereby the clearing clutch 314 is again opened and the above mentioned driving connection between the rod 333 and the clearing rack 329, 347, is again interrupted. Besides, the lug 498 of the retaining hook 475 again slides along on the straight upper face of the projection 499 and as soon as it falls down to the left of the projection, the connection at 488, 489 is released through swinging of both of the retaining hooks 474 and 475 in the anti-clockwise direction owing to the action of the spring 476. Further, the inclined edge 538 of the retaining hook 475 runs up on the lug 501 of the lever 502. As the spring 476 attached to the retaining hook 474 is weaker than the springs 510 and 515 engaging with the levers 502 and 504, the retaining hooks 475 and 474, on the sliding of the inclined edge 538 up on the lug 501 of the lever 502, are first swung somewhat in the clockwise direction which, however, is without importance.

As soon as the rod 468 is returned into its rest position represented in Fig. 33, the spring 476 connected to the retaining hook 474 comes into operation and swings the retaining hooks 474 and 475 into the position represented in Fig. 33, in which the recess 500 of the retaining hook 475 snaps over the lug 501 of the lever 502.

The retaining hooks 474 and 475 can swing freely into the position represented in Fig. 33, owing to the fact that the nose 481 of the previously swung shift member 482 offers now no resistance to the nose 479 of the retaining hook 474. The end 497 of the retaining hook 475 then lies against the pin 496 of the rod 468 in order to permit some play between the recess 500 of the retaining hook 475 and the lug 501 of the lever 502 for reasons to be hereinafter mentioned.

By the release of the total key 402 the shaft 406 has naturally rotated in the anti-clockwise direction, whereby the amount storing means 386, by means of the part 407, Fig. 37, 408, 411, 415, 416, 418, 420 and 422, is rotated from its operative position represented in Fig. 31 into its rest position as represented in Fig. 28. During the rotational movement of the amount storing means 386 from the wheel 384 to the comb 393 and vice versa, the wheels 392 are without guidance for a moment. In order to prevent a rotational movement of the wheels 392 at that moment, the securing device 394, 395, 397 (Fig. 29) is provided.

On the return of the lever 411 (Fig. 37) the parts 435 and 437, 438 and 440 to 442 also have taken up again their rest position represented in Fig. 37.

A premature release of the total key 402 has no action on the regular progression of the process just described, as a locking device 350 (Fig. 24) described under the heading "Clearing mechanism for the accumulator" does not permit of an earlier return of the lever 303 (Fig. 32) until the clearing operation has terminated whereby naturally the coupling of the amount storing means 386 with the wheels 384 is maintained by the parts 302, 489, 488, 468, 403, 404, 405, 406, 407 and so forth until the clearing operation of the numeral wheels 151 is completed and therewith the transfer of the value into the amount storing means 386.

If the total key 402 remains depressed longer than necessary, the clearing rack 347 is only moved to and fro whereby the clearing wheels 345 are rotated without however influencing the wheels 346 already standing at zero.

After the factor "11" which still stands in the revolution counter 128 is cleared by depression of the key 355, Figs. 1 and 24, the second product from the factors 12×16 is calculated in exactly the same manner as the above-mentioned product "121" from the factors 11×11. After the multiplication of the factors 12×16 the value "192" then appears in the three right hand inspection apertures of the accumulator 152.

Now, in order to obtain the sum of both products "121" and "192" it is only necessary to depress again the total key. In this case, however, the product "192" is not transferred to the amount storing means 386 but the first product "121" contained in the amount storing means 386 is added to the product "192" standing in the accumulator 152 by clearing the wheels 392.

This in the following manner.

As soon as a value is present in the amount storing means 386, the parts located on the right hand side of the machine assume the position represented in Fig. 35 while the parts located on the left hand side of the machine always take up one and the same rest position.

If now the total key 402 is depressed, to begin with the amount storing means 386 is swung out of the position according to Fig. 28 into the position according to Fig. 31 through the parts 403 (Fig. 33) 406 (Fig. 37) 407, 408, 409, 410, 411, 415, 416, 418, 420 and 422 in the manner already described above.

At this stage of the description, it seems advisable to mention the following:

As often as the key 402 is depressed, the parts 408 (Fig. 37) 409, 410, 411, 415, 416, 418, 420, 422, 386 are also actuated in any case, regardless of whether a value is transmitted from the accumulator to the amount storing means or vice versa, because in any transmission the wheels 392 of the amount storing means must be coupled with the wheels 384 on the numeral wheel shafts 150.

Of course, the parts 435 (Fig. 37) 437, 438 (Fig. 39) 441, 442 are also actuated in any depression of key 402, that is to say, any depression of key 402 results in the uncoupling of pin 440 from pin wheel 153. The purpose of uncoupling pin 440 from pin wheel 153 has already been mentioned.

However, a rotation of the parts 438, 441, 442 and consequently an actuation of the parts 443 (Fig. 37), 448, 449, 450, 453, 456, 461, 463 takes place only when a transmission from the amount storing means to the accumulator is performed. Only in this case the shaft 109 rotates and must be rotated, in order to rotate the actuating cam 442 for the clearing means 461, 463 of the amount storing means.

The control, whether on depression of the key 402 the accumulator is to be cancelled or the amount storing means, is an alternate one which is automatically performed by the hook unit 474, 475. If hook 474 engages part 489 the clearing mechanism for the accumulator is operated and no rotation of the shaft 109 takes place. This is always the case when the lever 482 is in the position shown in Fig. 32 and when the hook unit 474, 475 is taken along by the rod 468 in the direction of the arrow F from the position shown in Fig. 32.

If however, the hook unit 474, 475 and the hook 482 are in the position shown in Fig. 33 and key 402 is depressed, the hook 475 operates lever 502, whereby, as will be seen in the following, the shaft 109 is rotated and accordingly the clearing mechanism for the amount storing means 386 is operated, whereas the actuation of the clearing mechanism for the accumulator is suppressed.

In the uncoupling of the pin 440 (Fig. 39) from the pin wheel 153 the cam 442 effecting the clearing of the amount storing means 386 has naturally been displaced into the path of the roller 443 of the lever 448.

Further, on the depression of the total key 402, the revolution counter 128 has also been rendered inoperative in the manner hereinbefore described by means of the parts 525 (Fig. 33) 527, 528 and 56, so that the same does not operate.

After all the pre-settings, on the depression of the total key 402 have been effected, it is only necessary to place the shaft 109 in rotation, which occurs as follows:

In the movement of the rod 468 (Fig. 33) in the direction of the arrow F, the recess 500 of the retaining hook 475 takes the lug 501 of the lever 502 along with it in the direction of the arrow F, whereby the lug 498 of the retaining hook 475 slides along the under side of the projection 499 so that, as long as the total key 402 is held depressed, the engagement of the recess 500 of the retaining hook 475 with the lug 501 of the lever 502 is ensured by the projection 499, that is to say the lug 498 of the retaining hook 475 does not leave the projection in the movement towards the right. Accordingly the three levers 502, 504 and 506 (Fig. 34) are swung together round the screw 507 in the anti-clockwise direction. In this movement the pin 523 of the lever 524 slides up on the upper inclined edge of the nose 521 (Fig. 34) of the slot 522 of the lever 506. At this moment the clutch lever 88 has already been displaced so far through the pin 523 of the lever 524 and the shaft 62, that its lug 236 (Fig. 32) lies above and in front of the recess 537 of the lever 303, so that on any unintentional depression of the clearing key 296 from this instant on, no clearing of the accumulator is possible. On the further swinging of the lever 506 in the anti-clockwise direction, the pin 523 enters into the slot 522 of the lever 506, whereby the shaft 62 rigidly fixed to the lever 524 is further swung in the anti-clockwise direction and with it, also the clutch lever 88. This now releases the pawl 91 of the clutch 92 for the differential actuating mechanism whereby this is closed. Consequently through the wheel 100 (Figs. 32 and 37) not only the wheel 103 and the drive shaft 144 for the differential actuating mechanism, but also the shaft 109 is driven in the direction of the arrow 107 by means of the wheels 103, 105 and 106.

Further, the lug 501 (Fig. 33) of the lever 502 in consequence of its swinging movement in the anti-clockwise direction (the lug 501 being thereby raised somewhat), has swung the retaining hooks 475 and 474, as already mentioned, so far in the clockwise direction against the action of the spring 476 that they again take up the horizontal position represented in Fig. 35, which, in consequence of the corresponding formation of the lower face of the projection 499, they are capable of freely doing.

In the swinging movement of the levers 506, 502 and 504, around the screw 507 in the anti-clockwise direction, the horizontal arm of the lever 504 (Fig. 33) moves along the upper face of the projection 514 whereby in consequence of the yielding arrangement provided by the spring 515 engaging with its lug 517, the lever 504 is permitted to swing somewhat in the clockwise direction round the screw 503 and directly after leaving the projection 514 is swung under the action of its spring 515 in the anti-clockwise direction and so as to lie in front of the projection 514 as shown in Fig. 35 whereby even if the total and accumulator key 402 should be prematurely released, it cannot spring upward, because the parts 514, 504, 502, 501, 500, 475, 470, as positioned in Fig. 35 hold the rod 468 displaced in the direction of the arrow F and therefore the key 402 will be held in depressed position.

Further, it has been mentioned above that the shaft 109 (Fig. 37) rotates in the anti-clockwise direction by the closing of the clutch 92 for the differential actuating mechanism. Now, as likewise already mentioned, as the cam 442 is located in the path of the roller 443, it operates on the roller 443, whereby the parts 448, 449 and 450 are swung in the clockwise direction. The angle lever 453 is therefore likewise swung in the clockwise direction so that the rod 456 and with it the clearing rack 461 is displaced in the direction of the arrow A. By this means, all the clearing wheels 463 are rotated in the anti-clockwise direction (Figs. 37 and 26). Consequently, those wheels 392 which do not stand at zero, are returned to zero in the clockwise direction and as they are in engagement with the toothed wheels 384, fixed to the numeral wheel shaft 150, the wheels 384 together with the shafts 150 and the attached numeral wheels 151 are rotated in the anti-clockwise direction. As the three right hand numeral wheels 151 now indicated the value "192", by this operation there is added to this value, the value "121" cleared from the wheels 392. Initially, however, only the value "213" is indicated since the tens transfer to be undertaken from the tens denomination to the hundreds denomination is only prepared by the nose 173 (Figs 28 and 31) of the wheel 149 of the second numeral wheel shaft 150 from the right while this nose moves forward the preparatory slide 171 in the direction of the arrow D.

Before, however, the tens transfer so prepared can be executed, it is necessary to return the amount storing means 386 into its inoperative position represented in Fig. 28, as otherwise breakage of a tooth may take place since the wheels 392 already standing at zero in consequence of the striking of their projections 399 (Fig. 29) against the pins 400, are prevented from a further clockwise rotation as would arise from a tens transfer.

This is avoided in the following manner:

In the clearing of the amount storing means 386, the shaft 109 (Fig. 37) has rotated so far that the edge 539 of the disc 414 fixed on this shaft has operated the roller 413 of the lever 411. As a result, the lever 411 which is still with the upper end of its rack 415 in engagement with wheel 416, is now rocked in the clockwise direction, which it can do freely, as shortly before the parts 448, 449, 450 were swung by the cam 442 in the clockwise direction and therefore the pin 451 of the lever 450 by the action of the end 452 of the rod 408 has raised the recess 409 of the said rod from the pin 410 of the lever 411.

By the swinging movement of the lever 411 in the clockwise direction, the amount storing means 386 is moved into its inoperative position as represented in Figs. 37 and 28 in the manner already described through the parts 416, 418, 420 and 422, whereby the end 452 of the rod 408, which is still held displaced in the direction of the arrow F (Fig. 37) rests on the pin 410 of the lever 411, while the roller 413 of the lever 411 runs along on the concentric part of the cam 414.

By the swinging movement of the lever 411 in the clockwise direction the roller 429, however, has released the lever 427, so that this is now under the action of its spring 430 but cannot yet swing in the clockwise direction for the following reasons. The tensioned spring 439 (Figs. 37 and 38) tends to rock the lever 427 in the clockwise direction. Accordingly its arm 433 tends to rock lever 435, 437 (Fig. 39) from its position shown in dotted lines in Fig. 39 to the position shown in solid lines which however is not possible, since pin 440 of the element 438, 441, 442 cannot enter the hole in the right hand side disc 447 of pin wheel 153, until the element 438, 441, 442 has performed a complete revolution. Consequently, also lever 427 is not permitted to rock clockwise.

Immediately after the amount storing means 386 has again taken up its rest position illustrated in Fig. 28, the tens transfer operation takes place by raising, by means of the eccentrices 181 attached to the shaft 109 (Fig. 37), all the tens carry slides 180 (Fig. 28). As now only the preparatory member 171 in the tens denomination was displaced in the direction of the arrow D, so by the upward movement of its associated tens carrying slide 180, the latter is swung to the left, whereby the numeral wheel 151 of the hundreds denomination is rotated one unit further and therefore is moved from "2" to "3" so that now the correct total of 121+192 namely "313" appears in the accumulator 152.

Consequently the actual transference from the amount storing means 386 to the accumulator and the totalling of the products "121" and "192" are completed and it is only now necessary for those mechanisms which have not yet been returned to their rest positions to be brought back to these positions in which above all things care must be taken that no second rotation of the shaft 144 for the differential actuating mechanism occurs and the shift member 482 again changed over.

This takes place in the following manner:

Before completion of the first complete revolution of the shaft 109, the strip 439 (Fig. 35) fixed on the right hand end of this shaft engages the end 518 of the lever 502. In Fig. 36 is shown the position at the moment when the lever 402 is being swung by the strip 439.

By the engagement of the strip 439 with the upper end of the lever 502, the lever 502 is swung against the action of the spring 510 connected to it, in the clockwise direction round the screw 503 of the lever 506, and, of course, approximately for an amount represented by the length of the slot 508 (Fig. 34). The lug 501 (Fig. 36) is thereby withdrawn from the recess 500 of the retaining hook 475. Its arm 519 acts on the lug 487 of the shift member 482 and swings the same out of the position according to Figs. 35 and 33 and into the position according to Figs. 36 and 32, in which latter position the shift member 482 again points to the mark L (Fig. 33) and indicates to the operator that no value is contained in the amount storing means 386, therefore the amount storing means 386 is cleared.

In the swinging movement of the lever 502 in the clockwise direction (Fig. 36), it acts also on the lug 517 of the lever 504 and swings the latter likewise in the clockwise direction against the action of the spring 515 whereby the arm of the lever 504 which is inclined to the arm carrying the lug 517, releases the projection 514 as is represented in Fig. 36. As at this moment the strip 439 of the shaft 109 still acts on the upper end 518 of the lever 502 so the spring 510 acting on the lever 502 can now come into operation. As the pull of the spring is carried over onto the screw 503 of the lever 506, so the latter is swung round the screw 507 in the clockwise direction. With this movement, the horizontal arm of the lever 504 again extends over the projection 514 (Fig. 33) and the lever 506 is drawn against the projection 514 whereby the right hand end of the slot 508 of the lever 502 also comes to rest on the pin 509 of the lever 506.

At this juncture the pin 523 of the lever 524 has also again slid out of the slot 522 of the lever 506 according to Fig. 33, so that this latter lever, and with it the shaft 62 and the clutch lever 88 under the action of a spring (not illustrated) again take up their rest position in which the clutch 92 for the differential actuating mechanism is opened and thus only one revolution could be performed.

Finally after the completed revolution of the shaft 109 (Fig. 37) the pin 440 under the action of the spring 430 has again entered the hole of the right-hand side disc of the pin wheel 153 and has again coupled this with the shaft 109.

Moreover, the cam 442 has again been brought out of the path of movement of the roller 443.

Should at this point, the total key 402 be still held in the depressed position, it remains completely inoperative, as all the operative connections have been automatically interrupted.

If now the total key 402 is released, the rods 468 and 408 (Fig. 37) move in the direction of the arrow E. In this movement, the recess 469 of the rod 408, again snaps over the pin 410 of the lever 411.

The rod 468 (Fig. 33) previously moves both of the retaining hooks 474 and 475 in the direction of the arrow E whereby the lug 498 of the retaining hook 475 slides along under the projection 499. On this movement the inclined nose 536 of the retaining hook 475 moves on the lug 501 of the lever 502 and swings this, during the sliding movement of the lug 498 on the underside of the projection 499, somewhat in the clockwise direction around the screw 503 in order that, as soon as the lug 498 leaves the projection 499, it may swing back into its normal position. In the meantime, the nose 479 of the retaining hook 474 has also moved against the nose 481 of the shift member 482, which in the interim has again taken up the position according to Fig. 32, so the retaining hook 474 was swung against the action of the springs 476 and 492 in the clockwise direction into the position represented in Fig. 32 and consequently the retaining hook 475, as soon as its lug 498 has left the projection 499, can again take up its normal position represented in Fig. 32.

Should the total key 402 however, have been earlier released, it will be obvious that the above described return of the parts into the normal position follows on the return of the levers 502, 504, 506 into their normal position.

In order to avoid a depression of the total key 402 during the multiplying operation and consequent damage to the machine, the following arrangement is provided:

If the parts are located in the position represented in Fig. 32 (amount storing means 386 cleared) and if the carriage shift clutch 231 or the clutch 92 for the differential actuating mechanism is in operation, the lug 236 of the clutch lever 88 is disposed either underneath or above the recess 537 in front of the lever 303. If, therefore, in this case, the total key 402 was depressed, it can only be slightly depressed and indeed only to the point where, through the lug 498 of the retaining hook 475 moving up on the projection 499, the recess 488 of the retaining hook 474, embraces the arm 489. As soon as this occurs, the key 402 is locked against further depression, as the lug 236 lying in front of the lever 303, through the parts 302 and 489, prevents a forward movement of the rod 468. This slight movement of the total key 402 does not suffice to bring any parts of the amount storing means 386 into the operative position.

If the parts are located in the position represented in Fig. 33 (value in amount storing means 386) and if the carriage shift clutch 231 or the clutch 92 for the differential actuating mechanism is in operation, a depression of the total key 402 is likewise impossible, as then the pin 523 lies either in front of the nose 521 or 520 of the lever 506. Owing to the recess 500 of the retaining hook 475 embracing the lug 501 of the lever 502, mounted on the lever 506, a displacement of the rod 468, in the direction of the arrow F is not possible. Consequently in this position also operation of the accumulator mechanism is therefore impossible.

Now, in order to calculate the next product from the factors 13×15, it is necessary to transfer the total "313" of the two first products standing in the accumulator 152 again into the amount storing means 386.

This is again effected by simple depression of the total key 402, whereby exactly the same operations are enacted as in the above described transference of the first product "121" into the amount storing means 386.

After the third product from the factors 13×15 appears as "195" in the accumulator 152 and under conditions as before described for the purpose of adding the three products, the total key 402 is again depressed, the same operations are performed as in the above described transference of the first product "121" from the amount storing means 386 into the accumulator 152. Through this operation there is added to the third product "195" standing in the accumulator 152, the total 313 of the two first products so that now the amount "508" is registered in the accumulator 152.

As from this total, the product of the factors 25×5 is now to be deducted, by again depressing the total key 402, the amount "508" is brought from the accumulator 152 into the amount storing means 386.

Now the product arising from the factors 25×5 is calculated, but instead of adding the value "25" five times it is subtracted five times by depression of the subtraction key 196. Such multiplications which are performed by accumulated subtractions are called negative multiplications.

Since now, as has been explained under the heating "Subtraction", subtraction is performed by addition of the complementary value of the subtrahend, instead of subtracting five times "25", five times "999.999.999.975" is added which number is the complement of "25" with regard to a twelve denomination register:

```
             +999.999.999.975
             +999.999.999.975
−5 times 25= +999.999.999.975
             +999.999.999.975
             +999.999.999.975
             ────────────────
              999.999.999.875
```

The value "999.999.999.875" is therefore the product of "0"−(5×25) and may be read off from the numeral wheels 151.

In order, however, to be able to read the number 999.999.999.975 off in its positive form, there are attached to the shafts 150 besides the numeral wheels 151, additional numeral wheels 533, 535 (Fig. 40). These show the correct value "125", since the numeral wheel 535 of the units denomination in relation to the remaining numeral wheels 533 shows as rotated through one unit more in the clockwise direction therefore with its "0" lying opposite to the "0" of the numeral wheel 151.

Now, in order to render visible to the eye either of the numeral wheels 533 or 151, according to choice, an inspection aperture slide 540 represented in its dimensions by the double lines 541 (Figs. 41 and 42) is displaceably arranged in the cover plate (Figs. 41 to 43) of the register carriage 122, the slide 540 having inspection apertures 542 and 543 arranged in staggered relation to one another. By means of a knob 544 the slide 540 may be so adjusted that either the numeral wheels 151 or the numeral wheels 533, 535 are concealed. Obviously, for the revolution counter 128 and the multiplier setting mechanism 545 in addition to the usual inspection apertures, a second set of inspection apertures must be provided, in order that in the displaced position of the slide 540, the numeral wheels of these mechanisms may be still observed (see Figs. 41 and 42 revolution counter 128).

Accordingly, if there is present in the accumulator 152 the value 999.999.999.875 and in the amount storing means 386 the value 000,000,000,508 and the total key 402 is once more depressed, then in the accumulator the final result appears, viz:

999,999,999,875
plus 000,000,000,508 equals: 000,000,000,383

The "1" arising from tens transference to the left of the twelfth decimal place is suppressed as here there is no further numeral wheel.

In Figs. 44 and 45, further possibilities for the application of the amount storing means 386 are represented. The numeral wheels 151 of the accumulator 152 (Fig. 44) in this form of construction, can be coupled by a claw coupling 546 with the numeral wheels 127 (133) (Fig. 44) loosely rotatable on the numeral wheel shafts 150 of the accumulator or the numeral wheels 151 of the accumulator 152 may be coupled by a claw coupling 547 with the numeral wheels 548 (Fig. 45) of the multiplier setting mechanism 545. If the numeral wheels 151 of the result register 152 stand at "0" and if a fork-shaped lever 549, which is fixed on the shaft 550 and which embraces the ring sleeves of the numeral wheels 151 is swung by means of a manipulative member (not shown) fixed on shaft 550 so that the claw coupling 546 couples the numeral wheels 151 of the accumulator 152 with the numeral wheels 127 (133) of the revolution counter 128 then the numeral wheels 127 (133) of the revolution counter 128, on being rotated back to zero by their clearing mechanism, transfer a value from the revolution counter 128 to the accumulator 152. The sequence of the numbers of the numeral wheels 151 of the accumulator 152 and of the revolution counter 128 are arranged to run in opposite directions so that when the one is rotated back to zero the other is rotated forward, that is to say from zero through 1, 2, 3 to 9.

After the revolution counter 128 and the accumulator 152 have been coupled with one another by rocking of the shaft 550, and the clearing key 355 (Fig. 24) for the revolution counter 128 is depressed, then the value standing in the same is cleared and transferred to the accumulator 152. To this amount thus brought into the accumulator 152, an amount present in the amount storing means 386 can be added forthwith and the total then standing in the accumulator 152 may be transferred to the amount storing means 386.

It is therefore possible to add, in the accumulator 152, the quotient of a division to a product present in the amount storing means 386 or to add in the accumulator 152 several quotients, with the assistance of the amount storing means 386 or to receive the quotient in the amount storing means 386, displace the accumulator carriage to the right and in this position deliver up the quotient to the accumulator 152 for a further calculation in higher decimal places.

A condition for the transference of a value from the revolution counter 128 to the accumulator 152 is that the accumulator stands at zero, for in the rest position of the coupling wheels frame 161 (Fig. 21) the flap 168 locks the preparatory members 171 according to which the noses 173 (Fig. 28) do not permit a rotation of the numeral wheels 151 from "9" to "0" or from "0" to "9", but only from "0" through 1, 2, 3 etc. to "9" and from "9" through 8, 7, 6 etc. to "0".

The numeral wheels 548 (Fig. 45) of the multiplier setting mechanism 545 can obviously be coupled with the numeral wheels 151 of the accumulator 152 in a similar manner to that in which the revolution counter 128 can be coupled with the accumulator 152.

The sequence of the numbers on the numeral wheels 151 and 548 run also oppositely to one another. If by the rocking of the shaft 551 and the fork shaped lever 552, the claw couplings 547 are moved in such a manner that the numeral wheels 151 of the accumulator 152 are connected with the numeral wheels 548 of the multiplier setting mechanism 545, then by clearing the result register 152 by means of the clearing key 296 (Fig. 24) of the accumulator 152, a value may be transferred from the accumulator 152 to the multiplier setting mechanism 545.

In Figures 46 to 49, an example of calculation is shown, illustrating the manner in which a quotient, by means of the amount storing means 386, can be transferred to the multiplier setting mechanism 544. To commence with, the value "125" standing in the revolution counter 128 is transferred into the accumulation 152 by coupling the revolution counter 128 (Fig. 44) with the accumulator 152 and clearing the revolution counter 128. By depression of the total key 402 the value "125" is transferred into the amount storing means 386. The carriage 122 is then moved so far to the right that the corresponding decimal places of the multiplier setting mechanism 545 stand opposite to the value of the revolution counter 128, contained in the amount storing means 386. The total key 402 is again depressed and the value "125" is now transferred to the places shown in Fig. 48 of the accumulator 152. The multiplier setting mechanism 545 is then coupled with the accumulator 152 and the latter cleared. Consequently there now stands in the multiplier setting mechanism 545, according to Fig. 49, the value "125" which was first of all contained in the revolution counter 128.

Further it is possible to utilize another form of construction of the amount storing means 386, as is represented in Figs. 50 and 51. In this form of construction, the numeral wheel shafts 150 are unchanged, that is to say they carry, therefore, toothed wheels 384 on one of their ends. With these wheels 384 wheels 553 can engage which are rotatably mounted by screws 554 between a plate 555 and a strip 556, and which by means of springs 557 attached to the strip 556 by the screws 554 are retained in the same manner as is described for the form of construction represented in Fig. 29. On the same plate 555, clearing wheels 558 and a clearing rack 559 are arranged. The accumulator wheels 553, the accumulator clearing wheels 558 and the rack 559 are formed exactly as described in the first form of construction. The plate 555 is oscillably connected at 560, 561 with angle levers 562, 563 which are oscillably mounted at the points 564, 565 on the machine housing.

The two angle levers 562 and 563 are connected by a link 566. On the left hand end of the plate 555 a hole 567 is provided into which the ball-like end 568 of a double armed lever 569 projects which by means of a screw 570 is pivotally arranged on the machine frame. To the other end of the lever 569 a link 571 is pivoted which in its turn is pivoted at 572 to an arm 573 fixed to the rotatably arranged shaft 574 on which also the wheel 575 is fixed, which in its turn is in engagement with the rack 415 of the lever 411. It will be seen now that in lieu of the parts 390 (Fig. 37) 391, 387, 422, 420, 419, 418, 417 and 416 in Fig. 37, the parts 553 to 575 of the emodiment shown in Figs. 50, 51 may be arranged. If now, on depression of the total key 402, the lever 411 (Fig. 51) is rocked anti-clockwise, the rack 415 of the same rotates the wheel 575 clockwise, whereby through the intermediary of the parts 574, 573, 572, 571, 569, 568, 567, the plate 555 is moved in the direction of the arrow 576, with the aid of the linkage 562, 566, 563. Thereby all the parts 553 to 559 are also moved in the direction of the arrow 576, whereby the wheels 553 are brought into engagement with the wheels 384 on the numeral wheel shafts 150.

In order that in the movement of the plate 555, the clearing rack 559 (Fig. 50) is held in engagement with the lug 459 of the rod 456, the clearing rack 559 is provided with a comparatively long extension 577, having a long slot 578 so that when the plate 555 moves in the direction of the arrow 576, the slot 578 is held in engagement with the lug 459 of the rod 456. If now the clearing rack 559, which is slidably arranged on the plate 555 by means of guidings 579, 580 is displaced by the rod 456 in the direction of the arrow A, the amount storing means (wheels 553) are cleared through the intermediary of the clearing wheels 558, whereby the value contained in the amount storing means is transferred to the numeral wheels 151.

A further possible construction is shown in Figures 52 to 63, which permits to transfer the value contained in the amount storing means into its complementary value and to transfer such complementary value to the accumulator.

For this purpose each wheel 581 (Figs. 52 to 55) of the amount storing means is provided with two enlarged tooth spaces 582 (Fig. 54) and 583 (Fig. 52) which are brought about by removal of a tooth of half of its breadth. For the sake of a better understanding of the following description, the teeth of the wheels 581 in Figures 52, 54, 59 to 61 have been numbered like a numeral wheel. As may be seen from Fig. 52 the "0" is inscribed on the tooth of the enlarged tooth space 582. Fig. 53 shows clearly the strip 390 of the amount storing means at the left and the strip 391 of the amount storing means at the right. In this position of the amount storing means, the enlarged tooth space 582 co-operates with the enlarged tooth space 464 of its clearing wheel 463. This position of the amount storing means will be called the "real number position".

If now the amount storing means is rotated from the position in Fig. 53 through 180° round its trunnions 387 so that strip 391 (Fig. 55) is at the left and strip 390 at the right, the enlarged tooth space 583 co-operates with the clearing wheel 463. With regard to this tooth space the small numbers according to Fig. 54 correspond. The position of the amount storing means according to Figures 54 and 55 will be called "the complementary number" position.

The inoperative real number position of the amount storing means with regard to the wheels 384 is shown in Figure 57 whereas its operative real number position is shown in Figure 58.

If the amount storing means is rotated through 180° from its inoperative "real number" position, shown in Figure 57 the inoperative "complementary number" position will be obtained.

In order to change the amount storing means from its inoperative "real number" position to its inoperative "complementary number" position, the following arrangement is provided.

The left hand trunnion 387 (Figure 56) is provided on the left hand side of the lever 422 with a collar 584 and with a thumb wheel 585. Diametrically arranged in said collar 584 are two recesses 586 and 587 with which a nose 588 on a lever 589 co-operates. The lever 589 is pivotally arranged on the lever 422 at 590, whereby a spring 591 arranged between a pin 592 in the lever 422 and a finger knob 593 on lever 589 holds the latter in its operative position.

If it is desired to rotate the amount storing means from its inoperative "real number" position to its inoperative "complementary number" position it is simply necessary to lift the lever 589 by means of the finger knob 593 until the nose 588 releases its recess 586 of collar 584. Thereupon, the amount storing means is rotated through 180° by means of the thumb wheel 585 and the lever 589 is again released, whereby the new position (inoperative complementary number position) of the amount storing means is secured by the entrance of nose 588 in recess 587.

The control of the amount storing means from inoperative position to its operative position and vice versa is effected by the means 415 to 421 (Fig. 37) regardless of whether the amount storing means is in its inoperative "real number" position or in its inoperative "complementary number" position.

In order to explain the operation of the amount storing means of the embodiment shown in Figs. 52 to 63, it may be assumed that the amount storing means (wheels 581) is in the inoperative "real number" position according to Fig. 57, in which position the nose 588 (Fig. 56) of the lever 589 engages the recess 586 of the collar 584. It may further be assumed that in the accumulator 152 the value ....... 0003 is contained, in which case the numeral wheel 151 of the units denomination (Fig. 59) displays the digit "3" whereas all numeral wheels 151 of higher denominations display zeros. Accordingly also the wheel 384 of the units denomination has been rotated through three teeth whereas the remaining wheels 384 assume their zero position (note small numbers inscribed on wheels 384 in Fig. 59). Since the amount storing means is in its inoperative "real number" position (Fig. 57) all wheels 581 of the amount storing means assume their zero position (note small numbers inscribed on wheels 581 in Fig. 59) in which position their lugs 594 lie close to the lugs 595 (Fig. 61) on strip 391.

If now the total key 402 (Fig. 32) is depressed, the amount storing means shown in Figs. 59 and 57 is brought from its inoperative "real number"

position, shown in Fig. 57 to its operative "real number" position shown in Fig. 58 through the intermediary of the parts 404 (Fig. 32), 405, 406 (Fig. 37) 407, 409, 410, 411, 415, 416, 417, 418, 419, 420, 422. It will be recalled that the parts 581, 390, 391, 463, 596, 597, Figs. 59 and 57 are substituted for the parts 386 and 463 in Fig. 37. Accordingly the wheels 384 are coupled with the clearing wheels 463 (Fig. 58) by means of the wheels 581 of the amount storing means.

Since now, on depression of the total key 402 (Fig. 32) through the intermediary of the parts 468, 470, 474, 488, 489, 302, 303, 306 and 311 also the clearing clutch 314 is closed, the accumulator 152 is cleared as disclosed under the heading "Clearing mechanism for the accumulator". Accordingly, the numeral wheel 151 of the units denomination (Fig. 59) is rotated in the anti-clockwise direction back to zero, whereas all the remaining numeral wheels 151 remain unaffected. As a result, the wheel 581 of the units denomination of the amount storing means has been rotated from "0" to "3" (Fig. 60) whereas all the remaining wheels 384 of the amount storing means assume still their zero position (note small numbers inscribed on wheels 384 Fig. 60).

If now the total key 402 is released the amount storing means return to their inoperative "real number" position, shown in Fig. 57.

Thereupon, the amount storing means is rotated through 180° by lifting lever 589 (Fig. 56) and rotating the thumb wheel 585 until the nose 588 of the lever 589 is in front of the recess 587. Thereupon the lever 589 is released according to which its nose 588 engages the recess 587 and secures the amount storing means in its new position which is the inoperative "complementary number" position, shown in Fig. 61.

By comparison of Fig. 61 with Fig. 60, it will be seen through the intermediary of the small numbers inscribed on the wheels that with regard to the units denomination and with regard to the enlarged tooth space 583 (Figs. 54 and 61) the tooth corresponding to the digit "6" (which is the complement to "3") is in front of the enlarged zero space 464 of the clearing wheels 463, whereas with regard to the remaining wheels 581 of the amount storing means the teeth coresponding to the digit "9" (which is the complement to "0") are in front of the zero spaces 464 of the clearing wheels 463.

It will be seen now that the real value "......003" which was contained in the amount storing means has been transformed to its complementary value "......996" through the intermediary of a single rotation of the amount storing means through 180°. For the time being, the wheel 581 to the extreme left hand end in Fig. 61 need not be considered.

In passing, it may be recalled that the parts controlled by the total key 402 assume their position according to Fig. 33.

In order now to transfer the complementary value "......996" from the amount storing means to the accumulator, the total key 402 is depressed, whereby, as will be obvious, the amount storing means is rotated to its operative "complementary number" position (Fig. 55) whereupon through the intermediary of the hook unit 474, 575 (Fig. 33), also controlled by the total key 402, the clearing rack 461 is moved in the direction of the arrow A (Fig. 61). Accordingly the clearing wheels 463 are rotated in the clockwise direction (Fig. 61), thereby rotating all wheels 581 counter clockwise until their enlarged tooth space 593 is opposite the clearing wheels 463. During this rotation of the wheels 581 the mutilated tooth of the enlarged tooth space 582 remains in engagement with both the wheels 384 and the clearing wheels 463 because this mutilated tooth is now on that side of the wheels 581 which engages the wheels 384 and 463. Owing to the rotation of the wheels 581 in the anti-clockwise direction, the wheels 384 as well as the numeral wheel shafts 150 are rotated in the clockwise direction, viz., in the units denomination from "0" to "6" and in all remaining denominations from "0" to "9" so that the numeral wheels 151 of the accumulator 152 display the complement of "......003" namely "......996".

However, this is not the true complement of "......03", since in the units denomination only a "6" is present whereas a "7" should be displayed.

In order to add "1" in the units denomination, the following device is provided. To the right of the units denomination (in Figs. 59 to 61 to the left) the parts 463, 581, 599, 600 to 602 are provided. In contradistinction to the wheels 384 which have ten teeth, the wheel 599 has only nine teeth, so that when the extreme left hand wheel 581 in Fig. 61 is rotated by its clearing wheel 463 in the anti-clockwise direction, the wheel 599 and the parts 600 to 602 make one complete revolution in the clockwise direction. As a result, the nose 601 of the wheel 602 displaces its preparatory member 171 in the direction of the arrow D, whereby the edge 178 of the preparatory member 171 comes to lie in the path of the edge 179 of the tens carrying member 180. Accordingly, when the tens carrying member 180 is lifted by its eccentric 181 (see also Fig. 28) on the rotation of the shaft 109, the tens carrying member 180 is tilted to the right, as viewed in Fig. 61, thereby engaging with its tooth 188 the toothed wheel 184 of the numeral wheel shaft 150 of the units denomination and rotating the shaft 150 and its numeral wheel 151 by one unit, that is from "6" to "7" so that the accumulator 152 displays now the correct complement of "........003", namely "........997".

As has been pointed out in the foregoing, the shifting movement of the tens carrying members 180 is only performed after the amount storing means is again disengaged from the wheels 384, so that the wheel 384 is enabled to rotate clockwise by one unit without any hindrance. At this stage of the description, it may be pointed out that, of course, no peep hole is provided in the result register 152 over the shaft 600.

Here, it may also be mentioned that in the ordinary Mercedes Euklid calculating machine the parts 600 to 602, 171, 180 are already present and are necessary while performing subtractions. It has been pointed out hereinabove that subtraction is performed with this machine by adding the complement of the subtrahend. It is well known that with regard to this method of subtraction, the so called "fugitive 1" must also be added to the numeral wheel of the units denomination. In the Mercedes Euklid calculating machine, this is done by means of a nine toothed wheel 603 (Fig. 21) meshing with the rack 41 which, as explained under the heading "Subtraction", moves, while performing subtractions, nine units. Accordingly the wheel 603 makes a complete revolution. As a result also the shaft 604 and the ten toothed wheel 605 make a complete revolution which by means of the appertaining wheel 162 (shown in Fig. 21) of the coupling wheels frame 161 is transmitted to the wheel 602 (Fig. 61) whereby likewise through the intermediary of the parts 601, 171, 180 a tens transfer is obtained which adds the "fugitive 1" to the numeral wheel 151 of the units denomination. In subtractions the wheel 599 (Fig. 61) on shaft 600 does not interfere with the wheel 581 of the amount storing means, since the amount storing means is normally uncoupled.

It may be recalled that the amount storing means is still in its inoperative "complementary number" position and that its wheels 581 are cleared as regards this position.

If it is desired to transform the value ".....997" in the accumulator 152 to its real value, it is only necessary to depress again the total key 402 whereby the value "......977" is cleared and transferred to the amount storing means. Thereupon the amount storing means is rotated through 180° in the beforementioned manner, so that the collar 584 (Fig. 56) assumes the position shown in Fig. 56, thus securing the amount storing means anew in its inoperative "real number" position. If now the total key 402 is depressed again the wheels 581 of the amount storing means are cleared, whereby through the intermediary of the parts 599, 600, 602, 171, 180 a tens transfer is brought about, so that the accumulator 152 displays the correct "real" value ".......003".

With the help of this device it is therefore possible to change at any time a positive value into a negative value. This arrangement replaces therefore, a negative accumulator as insofar as a calculation results in a negative value this can instantly be changed in to a positive value.

Sometimes it may be desirable to clear the amount storing means without transferring the value, contained in the same, to the accumulator. To this end, the embodiment illustrated in Figures 52 to 63 is provided with double clearing wheels, that is to say, besides the ordinary clearing 463 a second clearing wheel 596 is provided which is fixed to the ordinary clearing wheel 463 by means of a sleeve 597.

In order to explain such independent clearing movement of the amount storing means it may be assumed that the same is in its inoperative "real number" position (Fig. 57) in which the nose 588 (Fig. 56) is in the recess 586 of the collar 584. Prior to such independent clearing movement, it is necessary to give the amount storing means another inoperative position which I will call the inoperative "independent clearing" position. This position is obtained by lifting the nose 588 (Fig. 56) out of the recess 586 and rotating the thumb wheel 585 until the nose 588 of lever 589 is in front of the recess 606, whereupon the lever 589 is released thus securing the amount storing means in its inoperative "independent clearing" position (Fig. 62). In order now to rock the amount storing means to its operative "independent clearing" position (Fig. 63) and to clear the amount storing means it is only necessary to depress the total key 402, because after the amount storing means has been brought to its inoperative "independent clearing position", the rocking angle of the same from Fig. 62 to Fig. 63 is exactly the same as the rocking angle from Fig. 57 (inoperative "real number" position) to Fig. 58 (operative "real number" position).

Of course, in order to actuate the clearing rack 461, the hook unit 474, 475 should be in the Fig. 33 position. If it should not be in this position, the total key 402 is nevertheless depressed in order to change the hook unit from the Fig. 32 position to the Fig. 33 position. In this case a transference from the accumulator to the amount storing means does not take place since a coupling of the amount storing means with the wheels 384 does not take place (Fig. 63).

If the hook unit 474, 475 is in the Fig. 33 position and the total key 402 is depressed, the clearing movement of the rack 461 is transmitted through the parts 463 and 597 to the clearing wheels 596 which in their turn clear the wheels 581 of the amount storing means.

Now, with regard to the following, reference may be had again to the first embodiment, shown in Figs. 26 to 39.

As has been seen from the foregoing, the amount storing means 386 is arranged stationary with regard to the movable carriage 122 so that values, standing in the units denomination of the accumulator 152 may only be transferred to the units denomination of the amount storing means 386, when the carriage 122 is in its rest position.

If however the carriage 122 is displaced towards the right all the digits of those denominations of the carriage 122 which are lying to the right of the units denomination of the amount storing means 386 are not transferred to the same.

Accordingly, if it is not desired to add the last decimal places of a calculated product, then the carriage 122 is moved through as many decimal places to the right as it is desired to eliminate. Consequently, no wheel 392 stands opposite to those numeral wheel shafts 150 which are lying to the right of the lowest decimal place of the amount storing means 386 and in the clearing of the accumulator 152 only those digits of the accumulator are transferred to the amount storing means which stand opposite the wheels 392 of the amount storing means 386.

I claim:

1. In a calculating machine, the combination with an accumulator, and accumulator clearing mechanism, of amount storing mechanism, clearing mechanism for the latter, a power drive for the clearing mechanisms including a pair of drive controlling units related to said clearing mechanisms, respectively, and normally ineffective, devices for rendering each unit of said pair effective, and means to alternately operate said devices comprising a manipulative member and a control member shiftable in opposite directions by the respective units, to effect such alternate operation of said devices.

2. In a calculating machine, the combination with an accumulator, and accumulator clearing mechanism, of amount storing mechanism, and clearing mechanism for the latter, a power drive for the clearing mechanisms including a pair of drive controlling units related to said clearing mechanisms, respectively, and normally ineffective, devices for rendering each unit of said pair effective, means to alternately operate said devices comprising a manipulative member and a control member shiftable in opposite directions by the respective units to effect such alternate operation of said devices, value entering mechanism between said accumulator and storing mechanism, to which said storing mechanism is adapted to be connected and disconnected, and means operative by said manipulative member for connecting said storing mechanism to said entering mechanism.

3. In a calculating machine, the combination with an accumulator including value wheels and shafts for said wheels, respectively, transmission gears on said shafts, and accumulator clearing mechanism, of amount storing mechanism including value storing gears adapted to mesh with said transmission gears, a frame in which said storing gears are mounted and swingable to mesh the storing gears with the transmission gears, clearing mechanism for the amount storing mechanism, a power drive for said clearing mechanisms including a pair of drive controlling units related to said clearing mechanisms, respectively, and normally ineffective, devices for rendering each unit of said pair effective, means to alternately operate said devices comprising a manipulative member a control member shiftable in opposite directions by the respective units to effect such alternate operation of said devices, and means operative by said manipulative member to swing said frame.

4. In a calculating machine, the combination with an accumulator including value wheels and shafts for said wheels, respectively, transmission gears on said shafts, and accumulator clearing mechanism, of amount storing mechanism including value storing gears adapted to mesh with said transmission gears, a frame in which said storage gears are mounted and swingable to mesh the storing gears with the transmission gears, clearing mechanism for the amount storing mechanism, a power drive for said clearing mechanisms including a pair of drive controlling units related to said clearing mechanisms, respectively, and normally ineffective, a key, means to alternately operate each clearing mechanism once for each depression of said key including devices for rendering each unit of said pair effective and a control member shiftable in opposite directions by the respective units to effect alternate operation of said devices, and means operative by said key to swing said frame.

5. In a calculating machine, a totalizing mechanism and an amount storing mechanism, one shiftable into operative relation to the other and also operative by the other in such relation, clearing mechanism for the totalizing mechanism, clearing mechanism for the storing mechanism, a key, mechanism operative by said key to shift said one mechanism into said relation, a power drive, individual operating means for the clearing mechanisms selectively operable by the power drive, means operated by said key to alternately render said individual operating means operative by said power drive once for each depression of said key.

6. In a calculating machine, the combination with an accumulator, transfer mechanism therefor including a transfer shaft, and accumulator clearing mechanism, of a power drive for said accumulator and mechanisms including a pair of clutches, means connecting one clutch to said accumulator and transfer shaft, means connecting the other clutch to said clearing mechanism, amount storing mechanism, clearing mechanism for said storing mechanism, means to operate the last mentioned clearing mechanism including a cam on said shaft, clutch engaging devices for each clutch of said pair, and means to alternately operate said clutch engaging devices once including a manipulative member, a member shiftable in opposite directions by the respective connecting means, and a pair of coupling hooks operative under the conjoint control of said members to couple to said engaging devices respectively.

7. In a calculating machine, the combination with an accumulator, transfer mechanism therefor including a transfer shaft, and accumulator clearing mechanism, of a power drive for said accumulator and mechanisms including a pair of clutches one related to said accumulator and transfer mechanism and the other related to said clearing mechanism, value entering mechanism between said shaft and accumulator adapted to be coupled to said shaft and accumulator, amount storing mechanism, clearing mechanism for said storing mechanism, means to operate said last mentioned clearing mechanism including a cam on said shaft shiftable in opposite directions to operate in one direction to render effective said value entering mechanism and in the opposite position to operate said last mentioned clearing mechanism, respectively, and means to alternately engage said clutches and to alternately shift said cam in opposite directions and comprising a manipulative member, and a rocking pawl connected to said member.

8. In a calculating machine, the combination with an accumulator, transfer mechanism therefor including a transfer shaft, and accumulator clearing mechanism, of a power drive for said accumulator and mechanisms including a pair of clutches one related to said accumulator and transfer mechanism and the other related to said clearing mechanism, value entering mechanism between said shaft and accumulator adapted to be coupled to said shaft and accumulator, amount storing mechanism, clearing mechanism for the amount storing mechanism, means to operate said last mentioned clearing mechanism including a cam on said shaft normally coupled to said value entering mechanism and shiftable into operative relation to said last mentioned clearing mechanism, clutch engaging devices for each clutch of said pair, means to alternately operate said clutch engaging devices including a key and a rocking pawl connected to said key, and means operative by said key to shift said cam.

9. In a calculating machine, the combination with an accumulator, of amount storing mechanism adapted to be coupled to said accumulator to operate the same, clearing mechanism for said storing mechanism, a control key, means to couple said storing mechanism to said accumulator operative by said key and including a rocking member movable to couple and uncouple said storing mechanism and said accumulator, and a drive for said clearing mechanism including a power driven cam shaft coacting sequentially with the clearing mechanism and with said rocking member to clear the storing mechanism and to uncouple the latter from the accumulator.

10. In a calculating machine, the combination with an accumulator, of amount storing mechanism adapted to be coupled to said accumulator to operate the same, clearing mechanism for said storing mechanism, a control key, means to couple said storing mechanism to said accumulator operated by said key, a drive for said clearing mechanism including a power driven cam shaft having a cam thereon shiftable to render said drive effective, means operative by said key for shifting said cam, and a cam on said shaft coacting with said coupling means to uncouple said storing mechanism.

11. In a calculating machine, the combination with an accumulator, and tens transfer mechanism therefor including a power driven transfer shaft, of amount storing mechanism adapted to be coupled to said accumulator to operate the same, clearing mechanism for said storing mechanism, a control key, means to couple said storing mechanism operative by said key, driving mechanism for said clearing mechanism including a cam on said shaft shiftable thereon by operation of said key to render said driving mechanism effective, and a cam on said shaft coacting with said coupling means to uncouple said storing means during the performance of transferring operations.

12. In a calculating machine, the combination with an accumulator, and accumulator clearing mechanism, of an amount storing mechanism, clearing mechanism for said storing mechanism, a power drive, individual operating means for the clearing mechanisms selectively operable by the power drive, and means to render said drive effective alternately relative to said clearing mechanisms and including a shiftable member operative by the operating means of one clearing mechanism to render said drive effective to operate the operating means of the other clearing mechanism.

13. In a calculating machine, having a casing, the combination with an accumulator, and accumulator clearing mechanism, of an amount storing mechanism, clearing mechanism for said storing mechanism, a power drive, individual operating means for the clearing mechanisms selectively operable by the power drive, and means to render said drive effective alternately relative to said clearing mechanisms and including a shiftable member operative by the operating means of one clearing mechanism to render said drive effective to operate the operating means of the other clearing mechanism, said member extending through said casing and indicating by shifting thereof which clearing mechanism is being driven.

14. In a calculating machine, the combination with an accumulator, and accumulator clearing mechanism, of an amount storing mechanism adapted to be coupled to said accumulator to operate the same and for operation thereby, clearing mechanism for said storing mechanism, a power drive, individual operating means for the clearing mechanisms selectively operable by the power drive, means to render said drive effective alternately relative to said clearing mechanisms and comprising a shiftable member operated by the operating means of one clearing mechanism to render said drive effective to operate the operating means of the other clearing mechanism, and means including a key for rendering said drive effective and coupling said amount storing means to the accumulator.

15. In a calculating machine, the combination with an accumulator, and tens transfer mechanism therefor including a tens transfer shaft, of amount storing mechanism adapted to be coupled to said accumulator to operate the same, clearing mechanism for said storing mechanism, means to operate said clearing mechanism including a driving member on said shaft, shiftable into effective position, means to couple said accumulator to the storing mechanism, and means including a key for simultaneously shifting said member and operating said coupling means.

16. In a calculating machine, the combination with an accumulator, tens transfer mechanism therefor, amount storing mechanism, transmission gearing between said accumulator and said storing mechanism to which said storing mechanism is adapted to be coupled, a power drive, clearing mechanism for the amount storing mechanism, mechanism for uncoupling the amount storing mechanism from said transmission gearing, means operated by the power drive to sequentially operate the clearing mechanism, the uncoupling mechanism and the tens transfer mechanism, a key, means operative by said key upon depression to couple said storing mechanism to said gearing and to control operation of the last mentioned means by said power drive.

17. In a calculating machine, the combination with an accumulator and a revolution counter, of amount storing mechanism adapted for operation by said accumulator, clearing mechanism for said storing mechanism, a power drive for said accumulator, the counter and the clearing mechanism including a clutch and driving connections to said accumulator and counter, a cam operated by said driving connections and shiftable to a position to operate said clearing mechanism, a key operative upon depression to shift said cam, and means operated by said key upon depression for controlling engagement of said clutch including mechanism settable by said driving connections to render said means ineffective by the next depression of said key.

AUGUST FRIEDRICH POTT.